United States Patent
Tsuchimoto

(10) Patent No.: US 10,545,799 B2
(45) Date of Patent: Jan. 28, 2020

(54) INFORMATION PROCESSING APPARATUS, METHOD FOR CONTROLLING SAME, AND STORAGE MEDIUM

(71) Applicant: CANON KABUSHIKI KAISHA, Tokyo (JP)

(72) Inventor: Tomokazu Tsuchimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 15/827,492

(22) Filed: Nov. 30, 2017

(65) Prior Publication Data
US 2018/0157541 A1    Jun. 7, 2018

(30) Foreign Application Priority Data

Dec. 1, 2016 (JP) ................................. 2016-234099

(51) Int. Cl.
*G06F 9/50* (2006.01)
*G06F 9/48* (2006.01)
*G06F 9/455* (2018.01)
*G06Q 20/14* (2012.01)

(52) U.S. Cl.
CPC ........ *G06F 9/5088* (2013.01); *G06F 9/45558* (2013.01); *G06F 9/4856* (2013.01); *G06F 9/5005* (2013.01); *G06F 9/5083* (2013.01); *G06Q 20/145* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2004/0194055 A1* | 9/2004 | Galloway | G06F 9/4875 717/101 |
| 2014/0229221 A1* | 8/2014 | Shih | G06Q 10/06313 705/7.23 |
| 2015/0309842 A1* | 10/2015 | Wu | G06F 9/5027 718/104 |
| 2018/0095751 A1* | 4/2018 | Aminot | G06F 9/4856 |

FOREIGN PATENT DOCUMENTS

JP    2016-507121 A    3/2016

\* cited by examiner

*Primary Examiner* — Qing Yuan Wu
(74) *Attorney, Agent, or Firm* — Canon U.S.A., Inc., IP Division

(57) ABSTRACT

An information processing apparatus that communicates with a plurality of servers in which use cost occurs at every predetermined time in executing a task obtains information indicating progress of the task from a first server executing the task. The information processing apparatus determines whether the progress of the task is delayed, based on the obtained information at timing based on the predetermined time at which the use cost occurs next time and time needed to transfer the task. If the progress of the task is determined to be delayed, the information processing apparatus selects a second server with a higher throughput than that of the first server, and instructs the selected second server to execute the task.

12 Claims, 24 Drawing Sheets

FIG. 13A
VIRTUAL MACHINE PRICE TABLE — 606

| MODEL IDENTIFIER | ARITHMETIC UNIT TYPE | NUMBER OF LOGICAL CORES | OPERATING FREQUENCY | MEMORY AMOUNT | ACCELERATOR | STORAGE AMOUNT | CHARGED PRICE | CHARGE TIMING |
|---|---|---|---|---|---|---|---|---|
| Machine-A | CPU-A | 2 | 3GHz | 4GB | NO | 128GB | 100YEN | 1HOUR |
| Machine-B | CPU-B | 32 | 3GHz | 32GB | GPU-A | 1TB | 500YEN | 1HOUR |
| ... | ... | ... | ... | ... | ... | ... | ... | ... |

FIG. 13B
PROGRAM MANAGEMENT TABLE — 608

| PROGRAM IDENTIFIER | USE OF PROGRAM | ARITHMETIC UNIT TYPE | MINIMUM NUMBER OF LOGICAL CORES | MINIMUM OPERATING FREQUENCY | MINIMUM MEMORY AMOUNT | MINIMUM ACCELERATOR | MINIMUM STORAGE AMOUNT |
|---|---|---|---|---|---|---|---|
| Program-A | REGISTRATION | CPU-A | 1 | NOT SPECIFIED | 2GB | NOT SPECIFIED | 1GB |
| Program-B | REGISTRATION | CPU-A CPU-B | 1 | NOT SPECIFIED | 2GB | GPU-B | 1GB |
| ... | ... | ... | ... | ... | ... | ... | ... |

FIG. 13C

VIRTUAL MACHINE USE MANAGEMENT TABLE ~ 611

| VIRTUAL MACHINE IDENTIFIER | MODEL | IMAGE FILE1 | IMAGE FILE2 | START OF USE | STATE | CHARGED PRICE | CHARGE TIMING |
|---|---|---|---|---|---|---|---|
| ID-A | Machine-A | Image-A | Image-B | 1981/6/20 18:45:06 | IN EXECUTION | 100YEN | 1HOUR |
| ID-A | Machine-A | Image-A | Image-C | 1999/12/31 23:59:99 | EXECUTION COMPLETED | 100YEN | 1HOUR |
| ... | ... | ... | ... | ... | ... | ... | ... |

FIG. 13D

EXECUTION TIME MANAGEMENT TABLE ~ 607

| MACHINE TYPE/ PROGRAM TYPE | Machine-A | Machine-B | ... |
|---|---|---|---|
| Program-A | 1000, 1, 16... | INOPERABLE | ... |
| Program-B | 9 | 7 | ... |
| ... | ... | ... | ... |

FIG. 13E

PROGRAM CHARACTERISTIC MANAGEMENT TABLE ~701

| | AVERAGE NUMBER OF REPETITIONS | AVERAGE PROCESSING TIME OF ONE ROUND OF REPETITIVE PROCESSING | AVERAGE END EVALUATION VALUE | STANDARD DEVIATION OF TOTAL EXECUTION TIME |
|---|---|---|---|---|
| FIRST REGISTRATION | 100 | 10 | 30 | 100 |
| SECOND REGISTRATION | 25 | 70 | 20 | 50 |
| THIRD REGISTRATION | 20 | 100 | 10 | 10 |

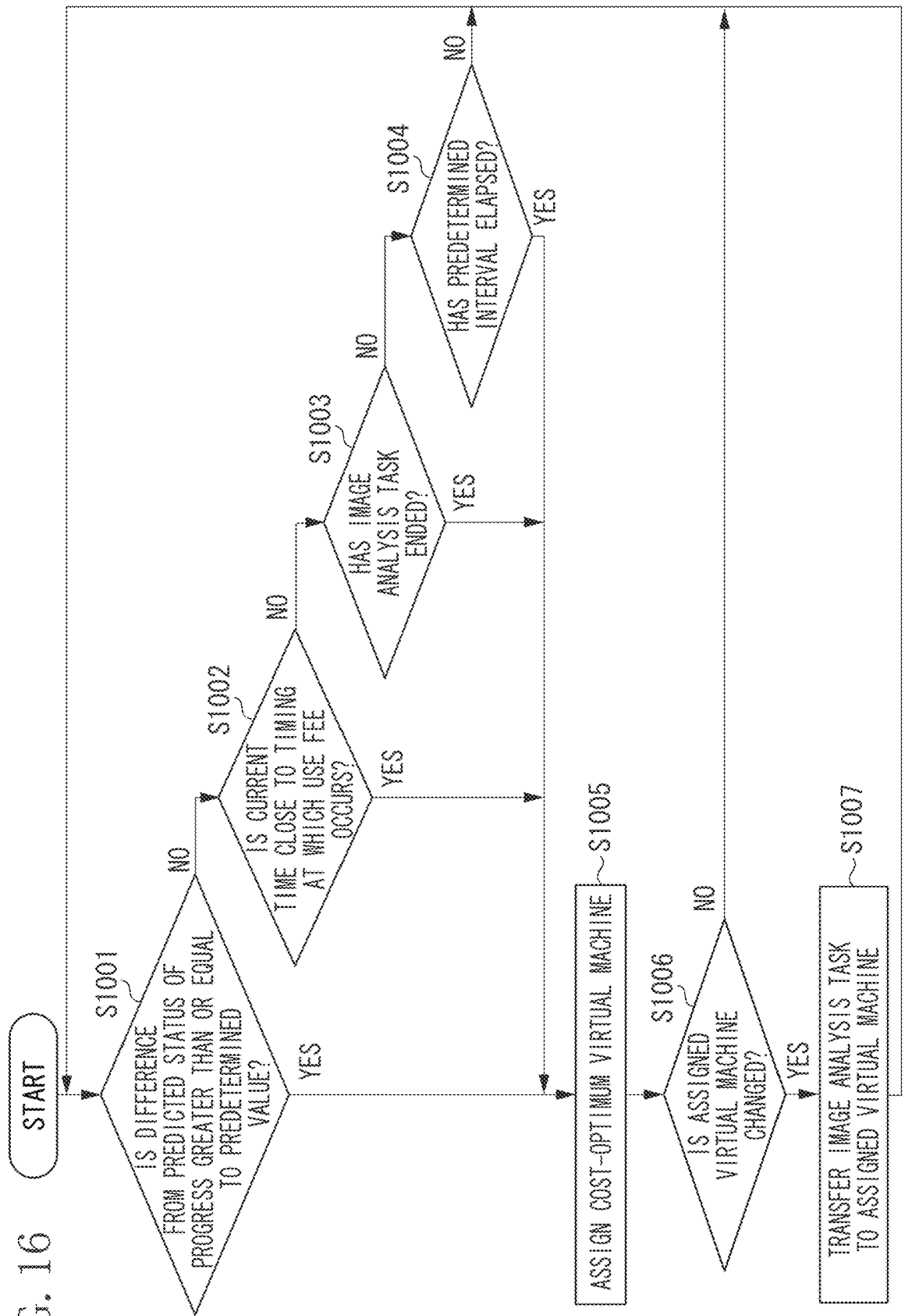

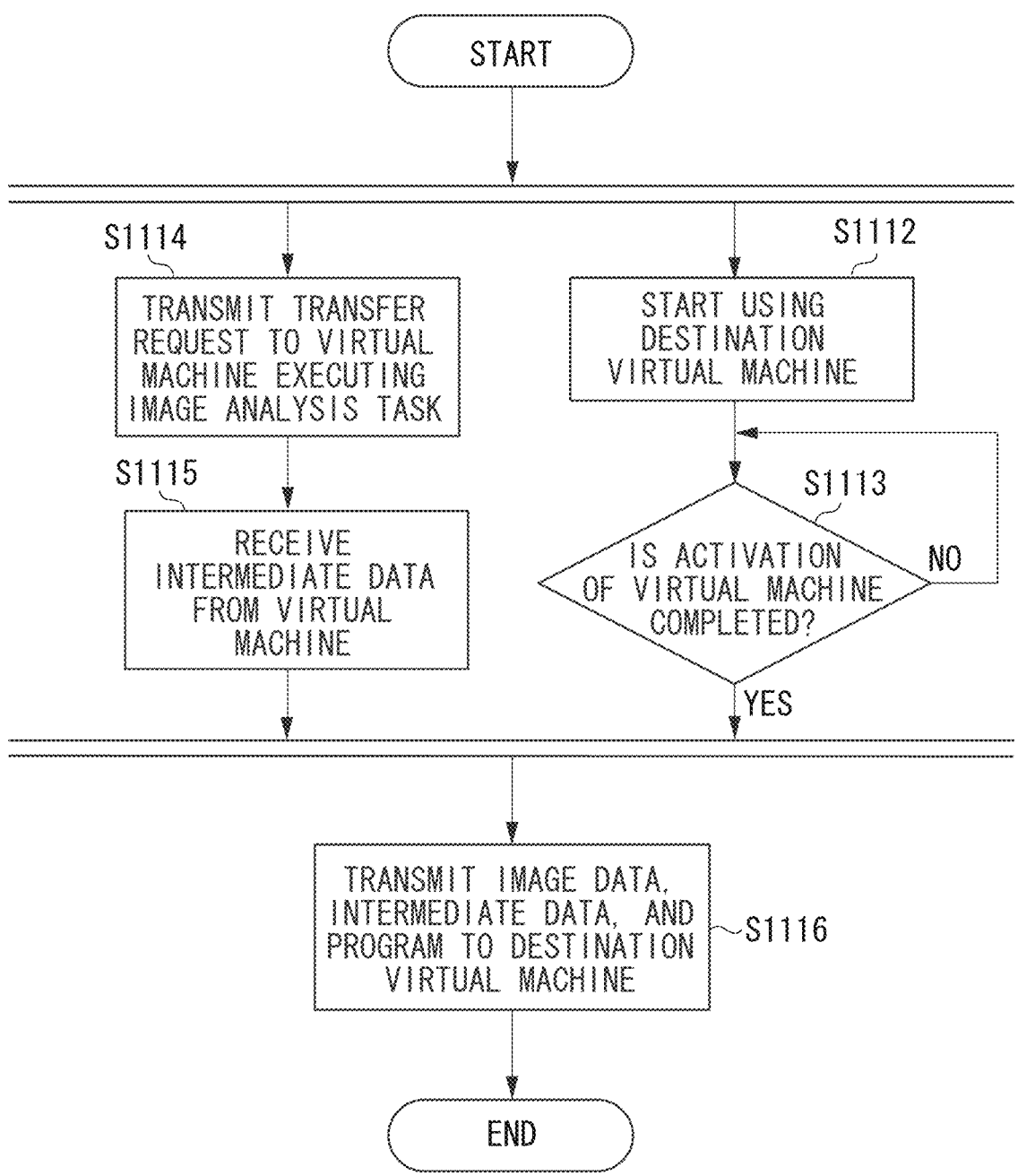

INFORMATION PROCESSING APPARATUS, METHOD FOR CONTROLLING SAME, AND STORAGE MEDIUM

BACKGROUND

Field

The present disclosure relates to an information processing apparatus, a method for controlling the same, and a storage medium.

Description of the Related Art

Image diagnosis apparatuses, such as a computational tomography (CT) apparatus or a magnetic resonance imaging (MRI) apparatus, generate medical images by imaging a patient. An image analysis of such medical images is performed by a workstation owned by a doctor or technician or in the image diagnosis apparatuses.

Techniques for performing image analysis on a cloud basis, i.e., by sharing computational resources of servers at remote places, have been spreading in recent years. Clouds are broadly classified into private clouds and public clouds. In private clouds, servers are managed by service providers themselves. In public clouds, server managers called cloud providers rent out servers.

In many public clouds, virtual machines including a virtualized central processing unit (CPU), accelerator, memory, and storage medium are used for a fee paid based on the type of the virtual machines and hours of use. Japanese Unexamined Patent Application Publication (Translation of PCT Application) No. 2016-507121 discusses a mechanism for selecting a virtual machine that can complete a task within a time limit and scheduling task execution.

There is more than one fee system of a virtual machine, including a pay-for-use system or a flat rate system. In the pay-for-use system, use cost occurs based on the use time of the virtual machine. In the flat rate system, a fixed use cost occurs regardless of the use time of the virtual machine.

In the pay-for-use fee system, if the progress of a task being executed by the virtual machine is delayed, the task takes longer to be completed and the amount of use cost can be higher than initially expected. To make up for the progress delay, the task can be transferred from the current virtual machine to a virtual machine with a higher throughput, but use cost can occur during the transfer of the task. Japanese Unexamined Patent Application Publication (Translation of PCT Application) No. 2016-507121 does not discuss any means for solving such problems.

SUMMARY

The present disclosure is directed to transferring a task, whose progress is delayed, to an appropriate server by a next predetermined time at which the use cost of a server occurs. The present disclosure is also directed to providing operations and effects that are derived from configurations described in a mode for carrying out the invention and not obtainable by conventional techniques.

According to an aspect of the present disclosure, an information processing apparatus that communicates with a plurality of servers in which use cost occurs at every predetermined time in executing a task includes an acquisition unit configured to obtain information indicating progress of the task from a first server executing the task, a determination unit configured to, based on the obtained information at timing based on the predetermined time at which the use cost occurs next time and time needed to transfer the task, determine whether the progress of the task is delayed, a selection unit configured to, if the determination unit determines that the progress of the task is delayed, select a second server with a higher throughput than that of the first server, and an instruction unit configured to instruct the selected second server to execute the task.

Further features will become apparent from the following description of exemplary embodiments with reference to the attached drawings.

BRIEF DESCRIPTION OF THE DRAWINGS

FIGS. 13A, 13B, 13C, 13D, and 13E are diagrams illustrating an example of a virtual machine price table, a program management table, a virtual machine use management table, an execution time management table, and a program characteristic management table according to the fourth exemplary embodiment, respectively.

FIG. 16 is a flowchart illustrating an example of a processing flow performed by a monitoring unit and a transfer control unit in processing performed by the image browsing apparatus according to the fourth exemplary embodiment.

FIG. 17B is a flowchart illustrating an example of transfer control of virtual machines.

DESCRIPTION OF THE EMBODIMENTS

Figure 1:
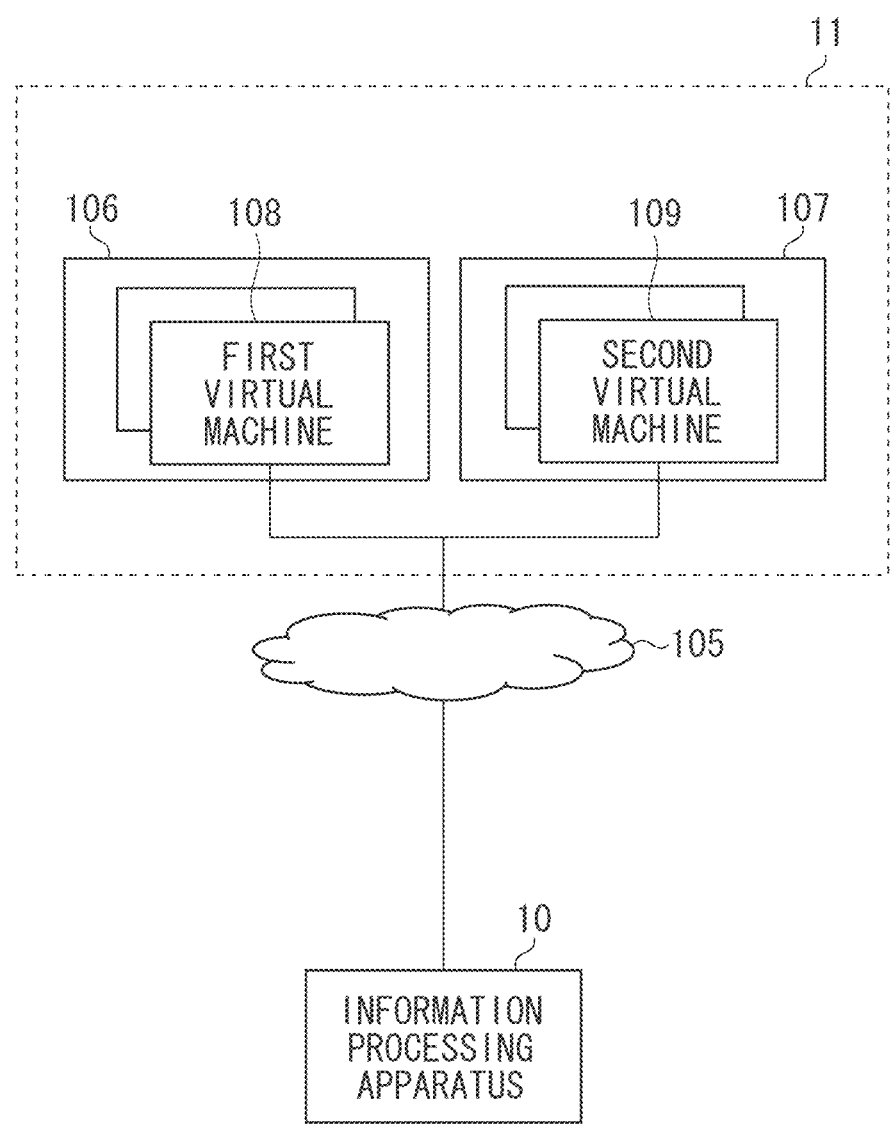
FIG. 1 is a diagram illustrating an example of a system configuration of an information processing system according to first to third exemplary embodiments.

Exemplary embodiments will be described below with reference to the drawings. The following exemplary embodiments are not seen to be limiting. All combinations of features described in the exemplary embodiments are not necessarily indispensable to implementing the exemplary embodiments. Similar components will be described with the same reference numerals.

Initially, an example of an outline of the exemplary embodiments will be described with reference to FIGS. 19 and 20. The exemplary embodiments relate to virtual machines of a pay-for-use fee system in which use cost (use fee) occurs at every predetermined time. As illustrated at times 2011-1 to 2011-6 in FIG. 19A, use cost occurs periodically (at each predetermined time) as a virtual machine continues to be used. If use cost occurs, the user can use the virtual machine until the next predetermined time (until use cost occurs next time). The exemplary embodiments will be described such that the use cost occurs at each predetermined time. However, this is not restrictive. Use cost can occur on a non-periodical basis.

Figure 19A:
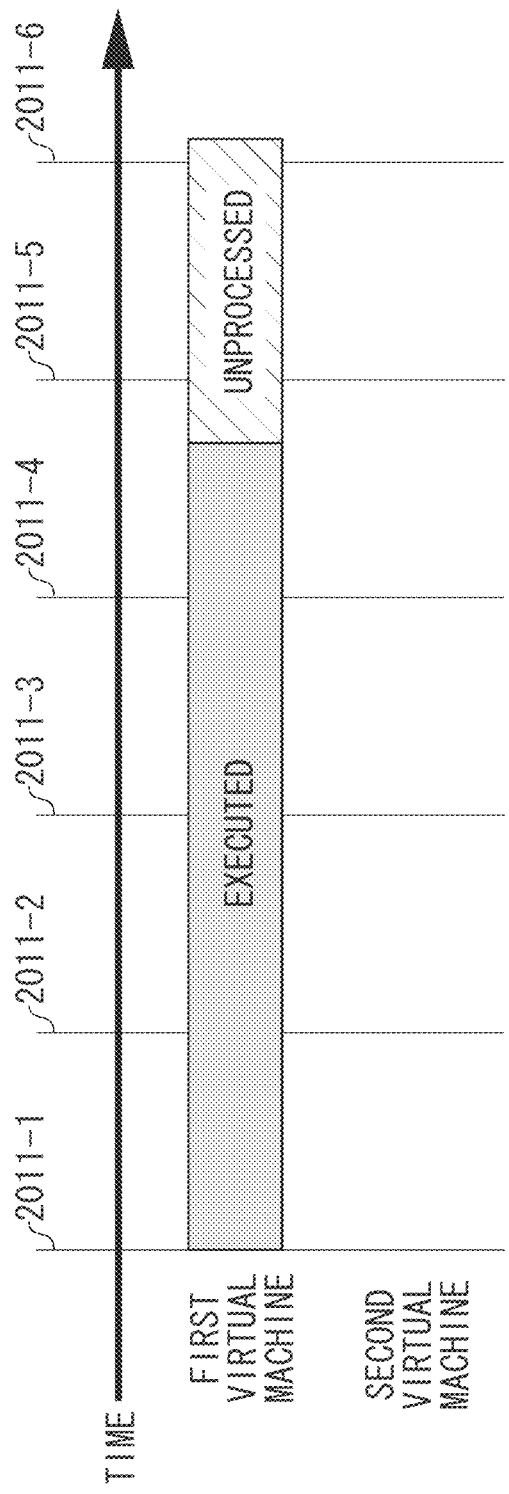
FIGS. 19A and 19B are diagrams for describing an outline of the exemplary embodiments.

The example of FIG. 19A illustrates a case in which a first virtual machine executes a task (referring to processing to be executed, such as image analysis processing, registration processing, and image conversion processing). The task is scheduled to be completed by time 2011-5, whereas its expected completion time exceeds time 2011-6 because of a progress delay.

Figure 19B:
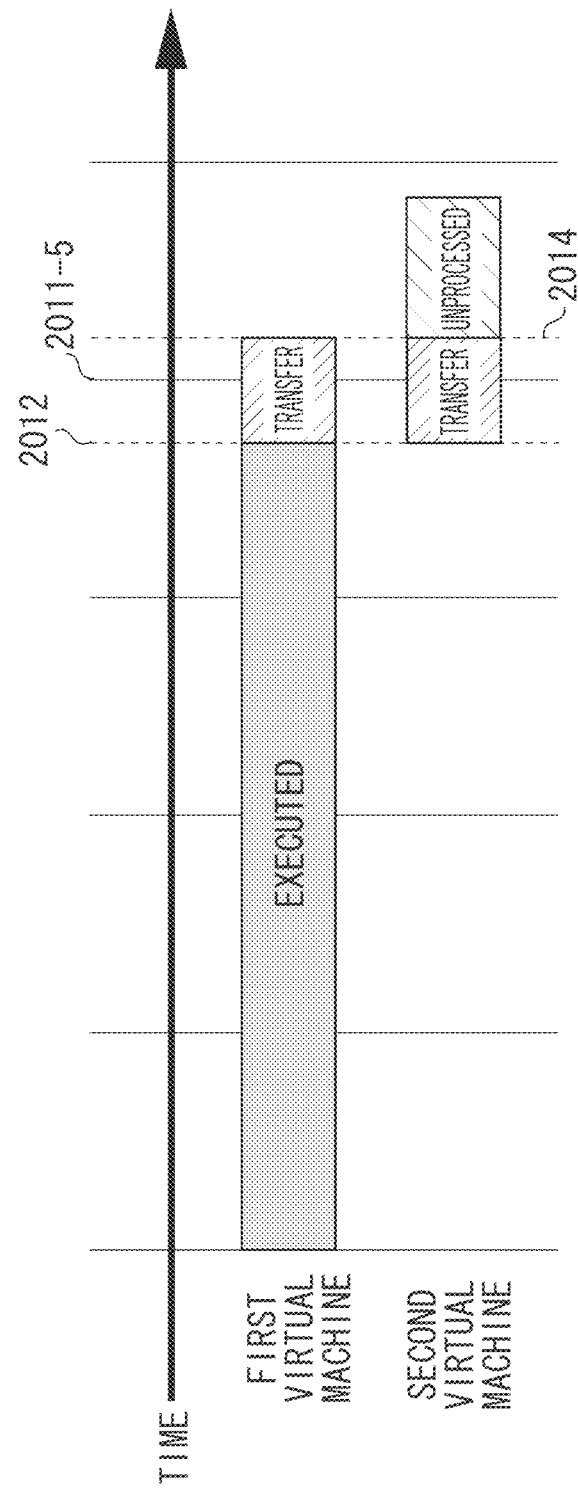

As a mechanism for improving the delay, an information processing apparatus can transfer the task to a second virtual machine having a higher throughput than that of the first virtual machine. FIG. 19B illustrates an example of such a transfer. FIG. 19B illustrates that the transfer processing starts at the current time 2012 and completes the transfer at time 2014. This can improve the progress delay of the task. However, the first virtual machine is used beyond time 2011-5, and use cost occurs at time 2011-5.

Figure 20:
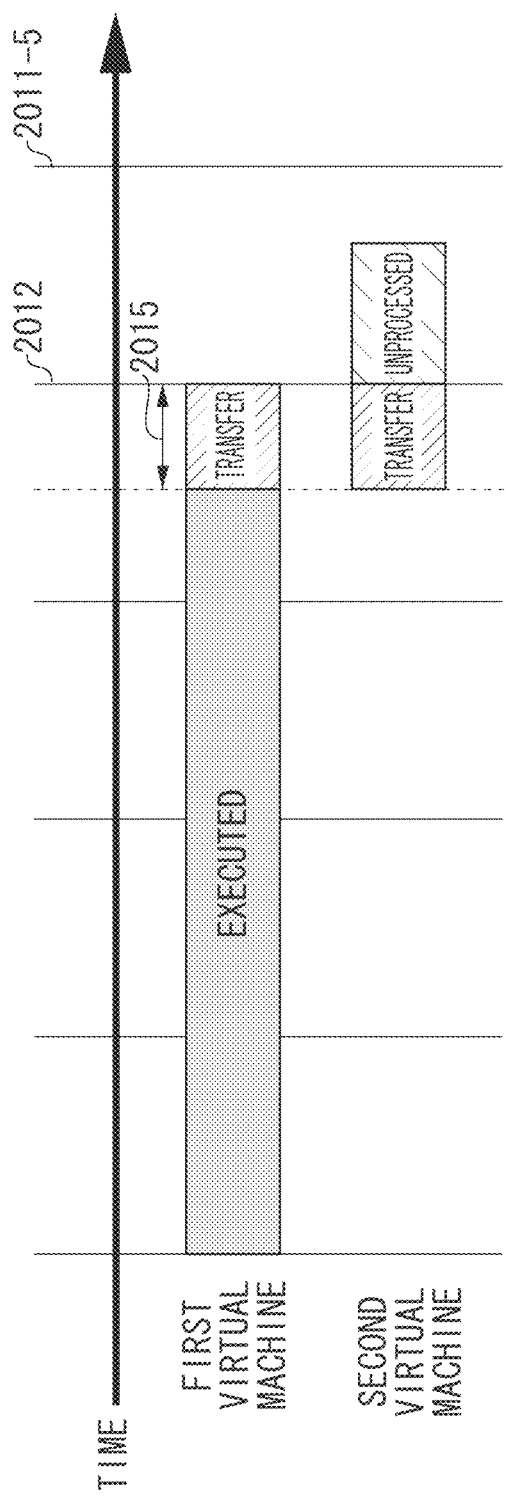
FIG. 20 is a diagram for describing an outline of the exemplary embodiments.

As illustrated in FIG. 20, the information processing apparatus then determines whether there is a progress delay (transfer is needed) when the current time 2012 reaches a time obtained by subtracting time 2015 needed for the transfer from a predetermined time 2011-5 at which use cost occurs next time. If the information processing apparatus determines that there is a progress delay (transfer is needed), the information processing apparatus transfers the task to the second virtual machine with a higher throughput than that of the first virtual machine. In such a manner, the progress delay can be improved in consideration of the predetermined time at which use cost occurs next time.

The exemplary embodiments will be described by using virtual machines that run by a virtualization technique, as an example. However, the virtual machines can be servers that are physical machines. The term server can include both a server that is a physical machine and a virtual machine.

An outline of the exemplary embodiments illustrated in FIGS. 19 and 20 will be described in detail below.

FIG. 1 is a diagram illustrating an example of a system configuration of an information processing system according to first to third exemplary embodiments. The information processing system includes an information processing apparatus 10 and a cloud system 11.

The information processing apparatus 10 is a personal computer. The information processing apparatus 10 can communicate with one or a plurality of virtual machines, and can issue execution instructions for tasks to the virtual machines and browse execution results thereof. In other words, the information processing apparatus 10 is an example of an information processing apparatus that communicates with a plurality of servers in which use cost occurs at every predetermined time in executing a task. The information processing apparatus 10 can be a server, a portable terminal, or a tablet terminal.

The cloud system 11 includes a plurality of types of virtual machines that is a plurality of types of virtualized physical machines managed by a cloud provider. Each virtual machine is connected to the Internet 105. The Internet 105 can be replaced with a local area network (LAN) as long as the information processing apparatus 10 and the cloud system 11 can communicate with each other. The type of the network is not limited to a particular type of network.

A first virtual machine group 106 is a set of first virtual machines 108. The first virtual machine group 106 is usable according to a use start request from the information processing apparatus 10 to the cloud provider, and end being used according to a use end request. Use fees (use cost) occur at predetermined intervals while the first virtual machine group 106 continues to be used.

A second virtual machine group 107 is a set of second virtual machines 109 including a processor with a higher throughput than that of the first virtual machine group 106. The second virtual machine group 107 is also usable according to a use start request from the information processing apparatus 10 to the cloud provider, and end being used according to a use end request. Use fees (use cost) also occur at predetermined intervals while the second virtual machine group 107 continues to be used.

In the present exemplary embodiment, two virtual machines (two virtual machine groups) including a first virtual machine (group) and a second virtual machine (group) will be described as an example. However, the number of virtual machines (virtual machine groups) can be greater than or equal to three. A plurality of information processing apparatuses 10 can be operated as one information processing apparatus 10.

Figure 2:
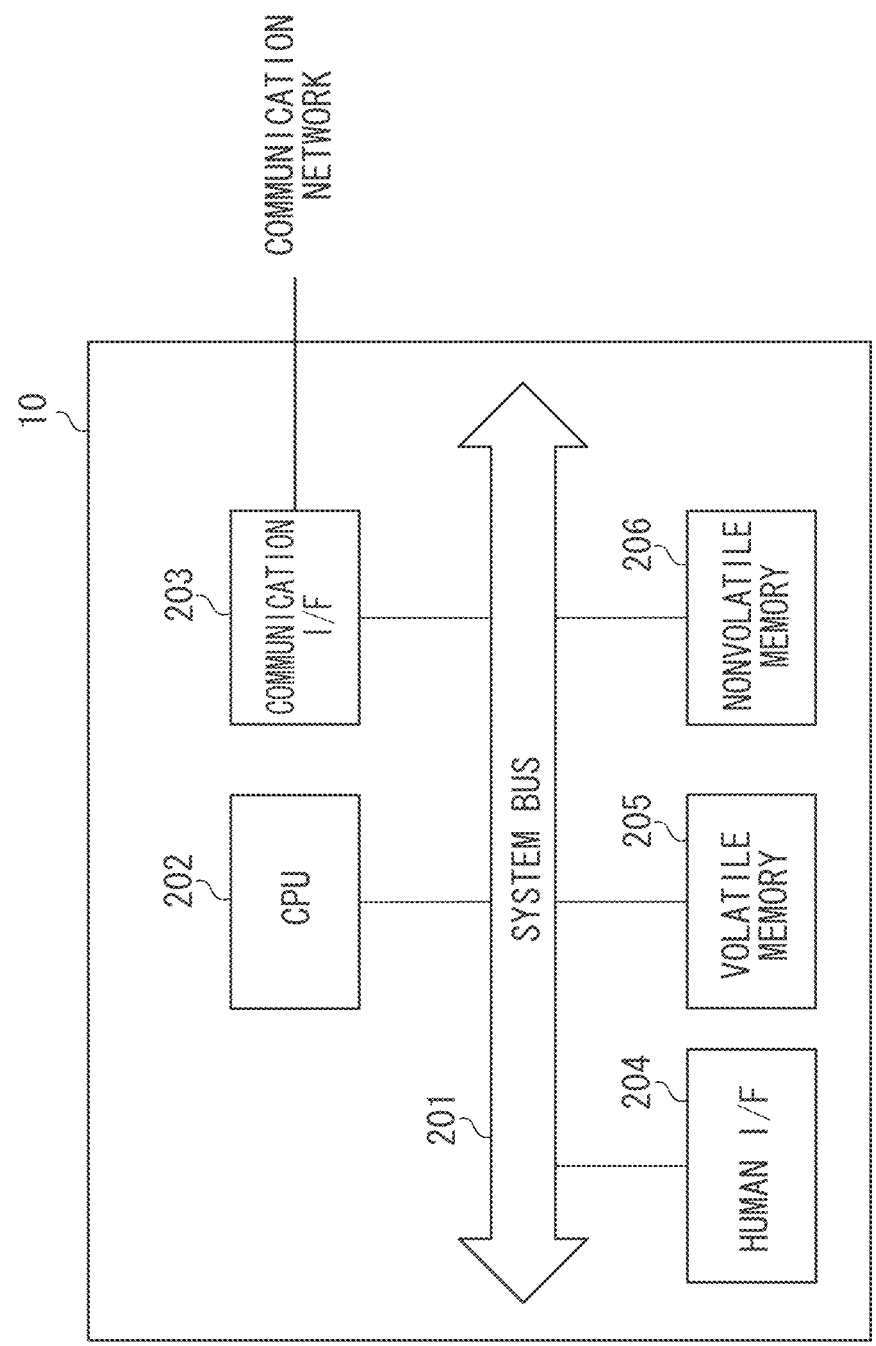
FIG. 2 is a diagram illustrating an example of a hardware configuration of an information processing apparatus according to the first to third exemplary embodiments.

FIG. 2 is a diagram illustrating an example of a hardware configuration of the information processing apparatus 10 according to the first to third exemplary embodiments.

A system bus 201 is a communication path for exchanging data between hardware components.

A CPU 202 executes a program and controls functional units.

A communication interface (I/F) 203 is an I/F connected to the Internet 105. The communication I/F 203 transmits and receives various types of information.

A human I/F 204 includes data display and operation input functions. Examples of the human I/F 204 include a touch panel, a keyboard, and a display.

A volatile memory 205 is used to temporarily store programs and data. Examples of the volatile memory 205 include a dynamic random access memory (DRAM).

A nonvolatile memory 206 stores programs and data. Examples of the nonvolatile memory 206 include a hard disk drive (HDD).

Figure 3:
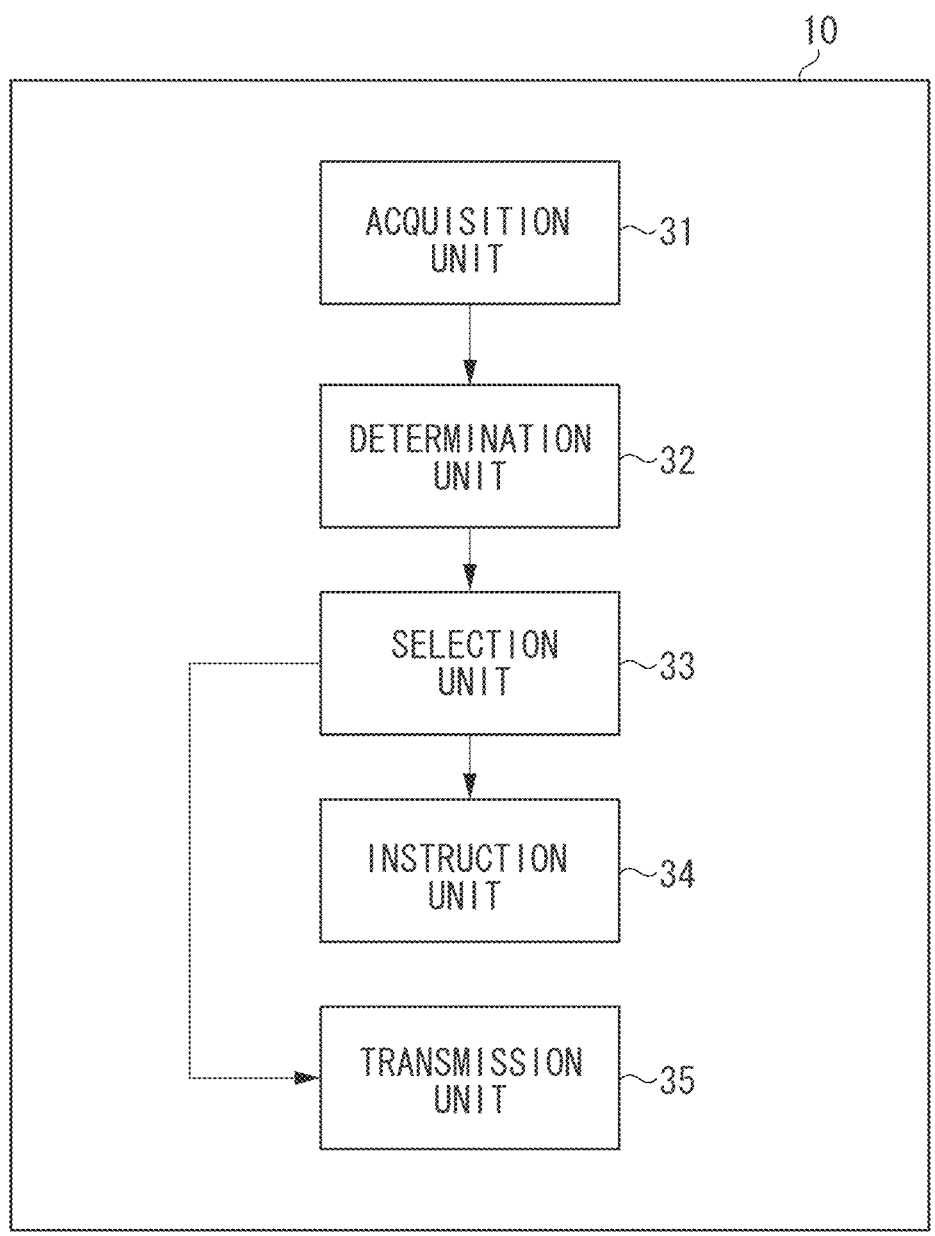
FIG. 3 is a diagram illustrating an example of functional blocks of the information processing apparatus according to the first to third exemplary embodiments.

FIG. 3 is a diagram illustrating an example of functional blocks of the information processing apparatus 10 according to the first to third exemplary embodiments. The information processing apparatus 10 includes an acquisition unit 31, a determination unit 32, a selection unit 33, an instruction unit 34, and a transmission unit 35 as its functional units. More specifically, the information processing apparatus 10 according to the first and second exemplary embodiments includes the acquisition unit 31, the determination unit 32, the selection unit 33, and the instruction unit 34. The information processing apparatus 10 according to the third exemplary embodiment includes the acquisition unit 31, the determination unit 32, the selection unit 33, the instruction unit 34, and the transmission unit 35. The functional units are implemented by executing by at least one CPU 202 a program stored in one or more of the DRAM 205 and the HDD 206.

The acquisition unit 31 is a functional unit that obtains information indicating progress of a task being executed by a virtual machine. If a first virtual machine 108 is executing a task, the acquisition unit 31 obtains information indicating the progress of the task from the first virtual machine 108. Examples of the information indicating the progress of a task include a scheduled completion time of the task, a rate of progress of the task, and an evaluation value obtained by evaluating an execution result of the task (corresponding to an evaluation value of the execution result of the task).

The determination unit 32 is a functional unit that determines whether the progress of the task is delayed (whether the task needs to be transferred), based on the information obtained by the acquisition unit 31. The timing at which the determination unit 32 makes the determination is a time obtained by subtracting time needed to transfer the task from a predetermined time at which use cost occurs next time in executing the task. Alternatively, the timing is a time before the time obtained by subtracting the time needed to transfer the task from the predetermined time at which use cost occurs next time in executing the task. The determination unit 32 thus determines whether the progress of the task is delayed, based on the information obtained by the acquisition unit 31 at timing based on the predetermined time at which use cost occurs next time and the time needed to transfer the task.

The selection unit 33 is a functional unit that selects a virtual machine to execute a task. If the determination unit 32 determines that the progress of the task is delayed, the selection unit 33 selects a virtual machine with a higher throughput than that of the virtual machine executing the task. A virtual machine that can complete the task by a predetermined time limit, e.g., a time specified by the user, is preferably selected as the virtual machine to be selected when the progress of the task is determined to be delayed.

The instruction unit 34 is a functional unit that instructs the virtual machine selected by the selection unit 33 to execute the task. In the second and third exemplary embodiments, the instruction unit 34 instructs the virtual machine executing the task to transmit information needed to execute the task (in the second exemplary embodiment, referred to as intermediate data). Examples of the intermediate data include data being processed and parameters.

The transmission unit 35 is a functional unit that transmits a program based on an environment of the virtual machine to execute the task to the virtual machine selected by the selection unit 33 in the third exemplary embodiment. Hardware types of processors and memories vary depending on the physical machines to run the virtual machines on. Programs suited to respective hardware environments are then stored in an HDD in advance. The transmission unit 35 obtains and transmits a program according to the destination virtual machine.

Figure 4:
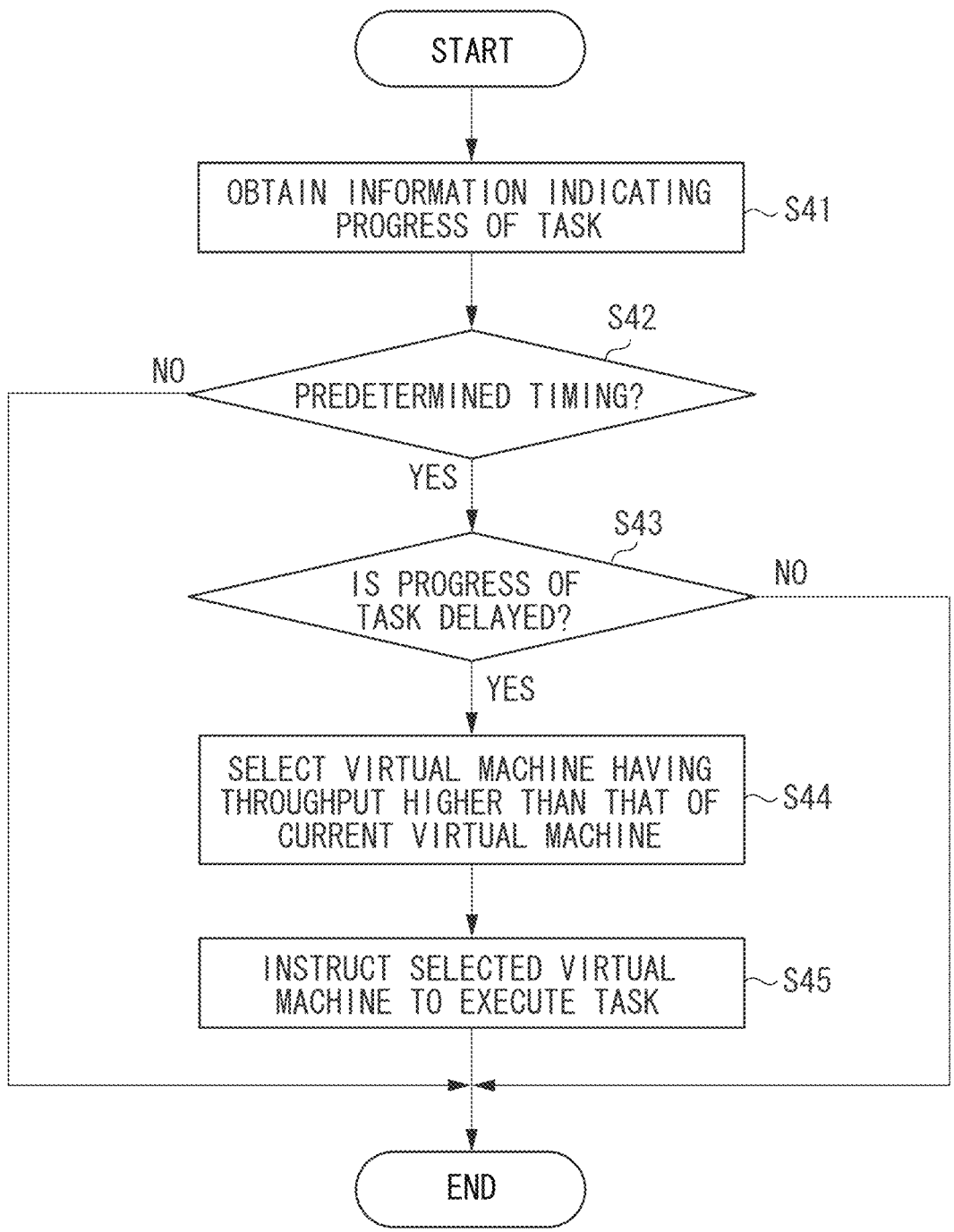
FIG. 4 is a flowchart illustrating an example of a processing flow according to the first exemplary embodiment.

FIG. 4 is a flowchart illustrating an example of a processing flow according to the first exemplary embodiment. Steps S41 to S45 described below are processes that the CPU 202 of the information processing apparatus 10 implements by operating the functional units.

The series of processes illustrated in FIG. 4 is started when a task starts to be executed. In step S41, the acquisition unit 31 of the information processing apparatus 10 obtains information indicating the progress of the task from the virtual machine (first server or first virtual machine 108) executing the task. The information indicating the progress of the task can be obtained by issuing a request from the acquisition unit 31 of the information processing apparatus 10 to the virtual machine executing the task. The virtual machine can periodically or non-periodically transmit the information to the information processing apparatus 10.

If the task is such that the virtual machine performs image processing a plurality of times, the virtual machine can transmit the information indicating the progress of the task to the information processing apparatus 10 each time the image processing is performed. In other words, the acquisition unit 31 is an example of an acquisition unit that obtains the information indicating the progress of the task each time the image processing of the task is executed.

In step S42, the determination unit 32 of the information processing apparatus 10 determines whether the current time is predetermined timing. More specifically, the determination unit 32 determines whether the current time is a time determined by subtracting the time needed to transfer the tasks from a predetermined time at which use cost occurs next time in executing the task. Alternatively, the determination unit 32 can determine whether the current time is a predetermined time before, e.g., one minute before or five minutes before, the time obtained by subtracting the time needed to transfer the task from the predetermined time at which use cost occurs next time in executing the task. In the present example, the predetermined time at which use cost occurs next time refers to the closest predetermined time after the current time among predetermined times at which use cost occurs. If the current time is such timing, the CPU 202 executes steps S43 to S45 described below.

The time needed to transfer the task can be time determined in advance or time needed to transfer the task that the CPU 202 predicts. If the CPU 202 predicts the time needed to transfer the task, the CPU 202 can calculate the time needed to transfer the task in consideration of processing time to interrupt the task, time to activate a new virtual machine, and time to transmit intermediate data in process to the new virtual machine.

If the determination unit 32 determines that the current time is the predetermined timing (YES in step S42), the processing proceeds to step S43. If the determination unit 32 determines that the current time is not the predetermined timing (NO in step S42), the present series of processes ends.

In step S43, the determination unit 32 of the information processing apparatus 10 determines whether the progress of the task is delayed (whether the task needs to be transferred), based on the information indicating the progress of the task, obtained in step S41. In other words, the determination unit 32 is an example of a determination unit that determines whether the progress of the task is delayed, based on the information indicating the progress of the task at timing based on the predetermined time at which use cost occurs next time and the time needed to transfer the task. The determination unit 32 can determine whether the progress of the task is delayed by comparing a progress schedule estimated by the information processing apparatus 10 or the virtual machine before or after execution of the task with the progress indicated by the information obtained in step S41. The determination unit 32 can predict the expected completion time of the task, and if the expected completion time exceeds a predetermined time limit that is specified by the user in advance, determine that the progress of the task is delayed. The determination unit 32 can determine that the progress of the task is delayed if the expected completion time exceeds a predetermined time limit that is specified by the user during execution of the task.

If the determination unit 32 determines that the progress of the task is delayed (YES in step S43), the processing proceeds to step S44. If the determination unit 32 determines that the progress of the task is not delayed (NO in step S43), the present series of processes ends. In other words, if the progress of the task is not delayed, the information processing system does not transfer the task.

In step S44, the selection unit 33 of the information processing apparatus 10 selects a virtual machine (second server or second virtual machine 109) with a higher throughput than that of the virtual machine currently executing the task. In other words, the selection unit 33 is a selection unit that selects a second server with a higher throughput than that of the first server if the progress of the task is determined to be delayed. In the present example, the throughput of a virtual machine is determined in consideration of any one or all of the following: the processing speed of a processor of the server on which the virtual machine runs, the memory capacity of the server, communication speed, or the execution speed of the program. The cloud provider provides a plurality of virtual machines with different throughputs in advance. A virtual machine of higher order than the currently used one can be selected from such virtual machines.

Some tasks have a time limit within which they need to be completed. In such a case, the selection unit 33 preferably selects a virtual machine that can complete the task by the time limit. In other words, the selection unit 33 is an example of a selection unit that selects a server that can complete the task by a predetermined time limit, as the second server. For example, the information processing apparatus 10 can predict completion times for situations in which the rest of the task is executed by respective virtual machines, and extract one that can complete the task before the time limit. The completion times can be predicted by the respective virtual machines.

In step S45, the instruction unit 34 of the information processing apparatus 10 instructs the virtual machine selected in step S44 to execute the unprocessed portion of the task. In other words, the instruction unit 34 is an example of an instruction unit that instructs the selected second server to execute the task. More specifically, the instruction unit 34 instructs the virtual machine having executed the task so far to interrupt the execution of the task. The information processing apparatus 10 then transmits information needed to execute the task to the selected virtual machine, and requests the virtual machine to start executing the task. In such a manner, the information processing system transfers the task to the new virtual machine. The instruction unit 34 can instruct the selected virtual machine to execute the task from the beginning or to start executing the task in the middle. The instruction unit 34 desirably instructs the selected virtual machine to execute the unprocessed portion of the task.

After the completion of the processing of step S45, the present series of processes ends. The information processing apparatus 10 repeats the series of processes illustrated in FIG. 4 until the task is completed. If the task is completed, the information processing apparatus 10 stops repeating the series of processes.

As described above, the information processing apparatus 10 can execute the processes to transfer the task of which the progress is delayed to an appropriate server by the next predetermined time at which the use cost of a server (virtual machine) occurs.

Figure 5:
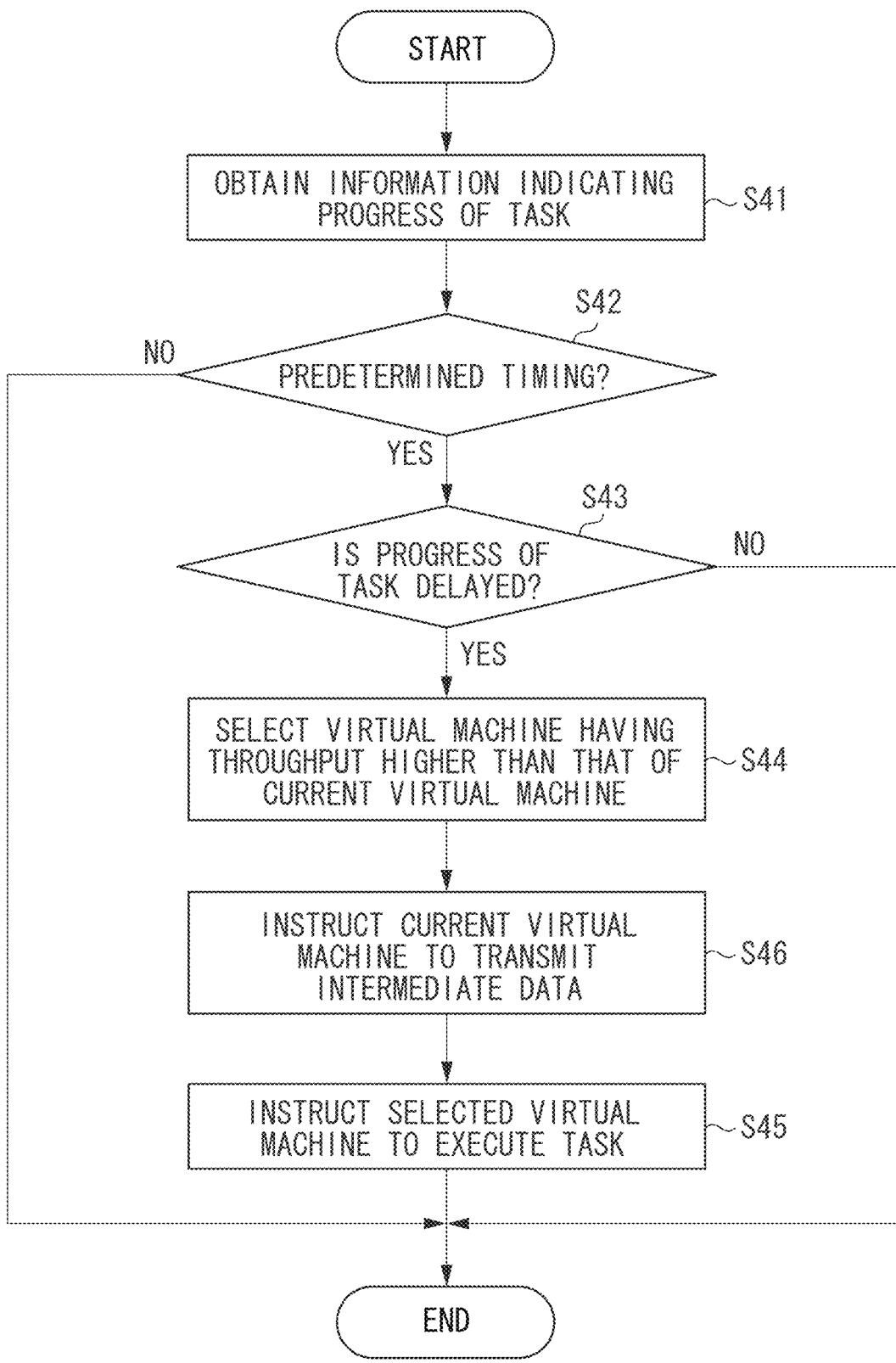
FIG. 5 is a flowchart illustrating an example of a processing flow according to the second exemplary embodiment.

FIG. 5 is a flowchart illustrating an example of a processing flow according to the second exemplary embodiment. Steps S41 to S46 described below are processes that the CPU 202 of the information processing apparatus 10 implements by operating the functional units.

Steps S41 to S45 are similar to those of the first exemplary embodiment. A description thereof will thus be omitted. In the second exemplary embodiment, a new step S46 added to steps S41 to S45 of the first exemplary embodiment will be described.

After the completion of the selection of the virtual machine in step S44, the processing proceeds to step S46. In step S46, the instruction unit 34 of the information processing apparatus 10 instructs the virtual machine currently executing the task to transmit intermediate data. In other words, the instruction unit 34 is an example of an instruction unit that instructs the first server to transmit information needed to execute the task. The destination to transmit the intermediate data to can be the virtual machine selected in step S44 or the information processing apparatus 10. If the intermediate data is transmitted to the information processing apparatus 10, the information processing apparatus 10 transmits the intermediate data to the virtual machine selected in step S44. In such a manner, the intermediate data is transferred to the selected virtual machine so that the virtual machine can smoothly resume the task.

Figure 6:
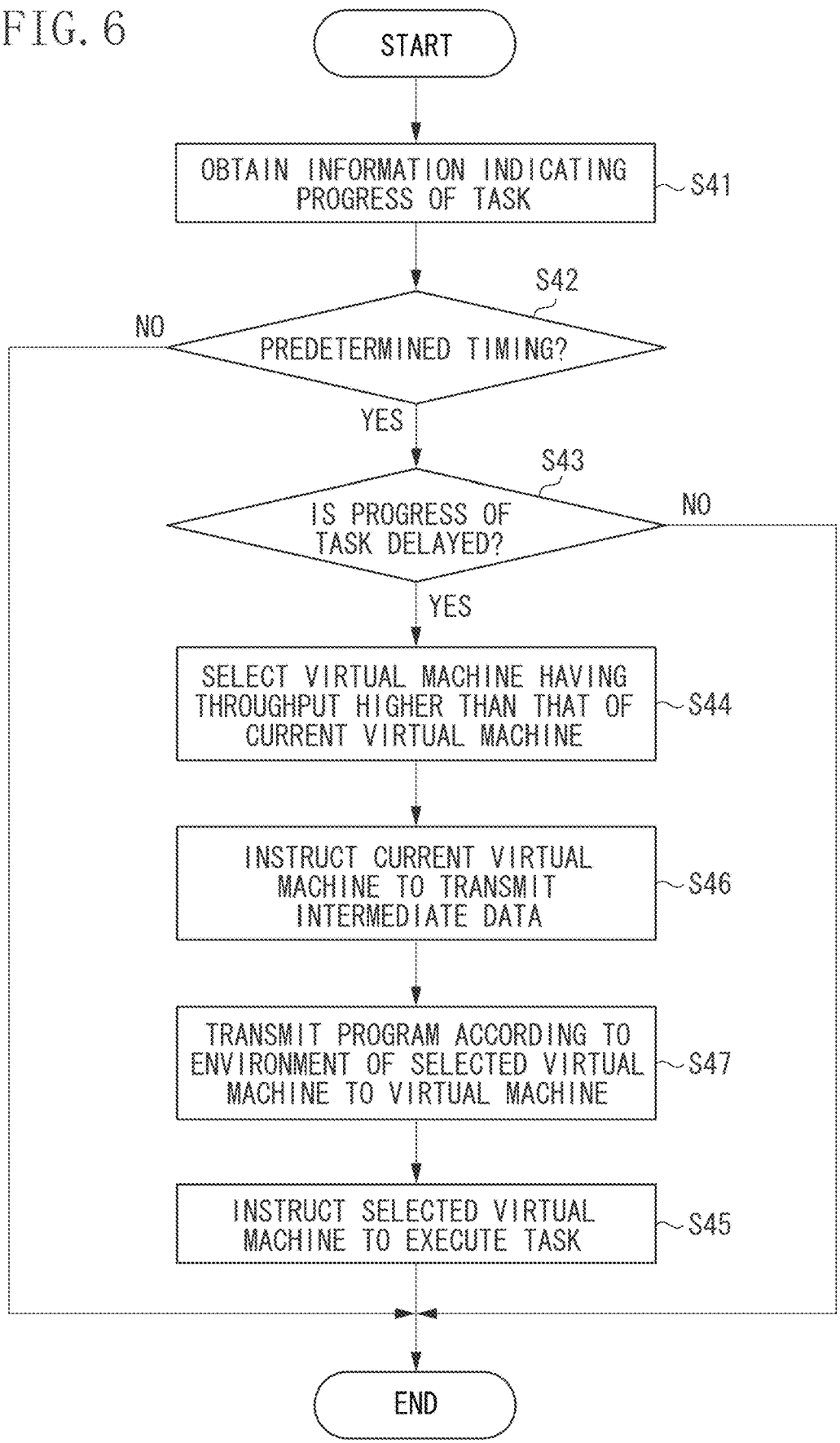
FIG. 6 is a flowchart illustrating an example of a processing flow according to the third exemplary embodiment.

FIG. 6 is a flowchart illustrating an example of a processing flow according to the third exemplary embodiment. Steps S41 to S47 described below are processes that the CPU 202 of the information processing apparatus 10 implements by operating the functional units.

Steps S41 to S46 are similar to those of the first and second exemplary embodiments. A description thereof will thus be omitted. In the third exemplary embodiment, a new step S47 added to steps S41 to S46 of the second exemplary embodiment will be described. Since step S46 is not indispensable, step S47 may be added to the flowchart of the first exemplary embodiment.

After the completion of the transmission instruction for the intermediate data in step S46, the processing proceeds to step S47. In step S47, the transmission unit 35 of the information processing apparatus 10 transmits a program according to the environment of the virtual machine selected in step S44, to the virtual machine. In other words, the transmission unit 35 is an example of a transmission unit that transmits a program according to the environment (hardware configuration) of the server to execute the task to the selected second server. The program is one intended to execute the task. For example, if the task is image analysis processing, the program is one that can perform the image analysis processing. The user stores a plurality of programs according to the environments of various virtual machines in the HDD of the information processing apparatus 10 in advance. The transmission unit obtains and transmits a program corresponding to the environment of the selected virtual machine to the virtual machine.

The virtual machines (servers) can include respective processors and memories of different performance characteristics. Tasks can be efficiently executed if appropriate programs according to the hardware of the virtual machines can be run. For example, if the virtual machine currently executing a task does not include a graphics processing unit (GPU), the virtual machine needs to execute a program that performs image processing by using a CPU. If the destination virtual machine includes a GPU, a program that performs the image processing by using the GPU can be used. The information processing apparatus 10 then transmits such a program. This can improve the processing speed of the task.

Next, a fourth exemplary embodiment will be described. In the fourth exemplary embodiment, a more detailed description will be given using a case in which, as an example, virtual machines perform image analysis processing of medical images. Each exemplary embodiment is applicable not only to medical images or image analysis processing.

Figure 7:
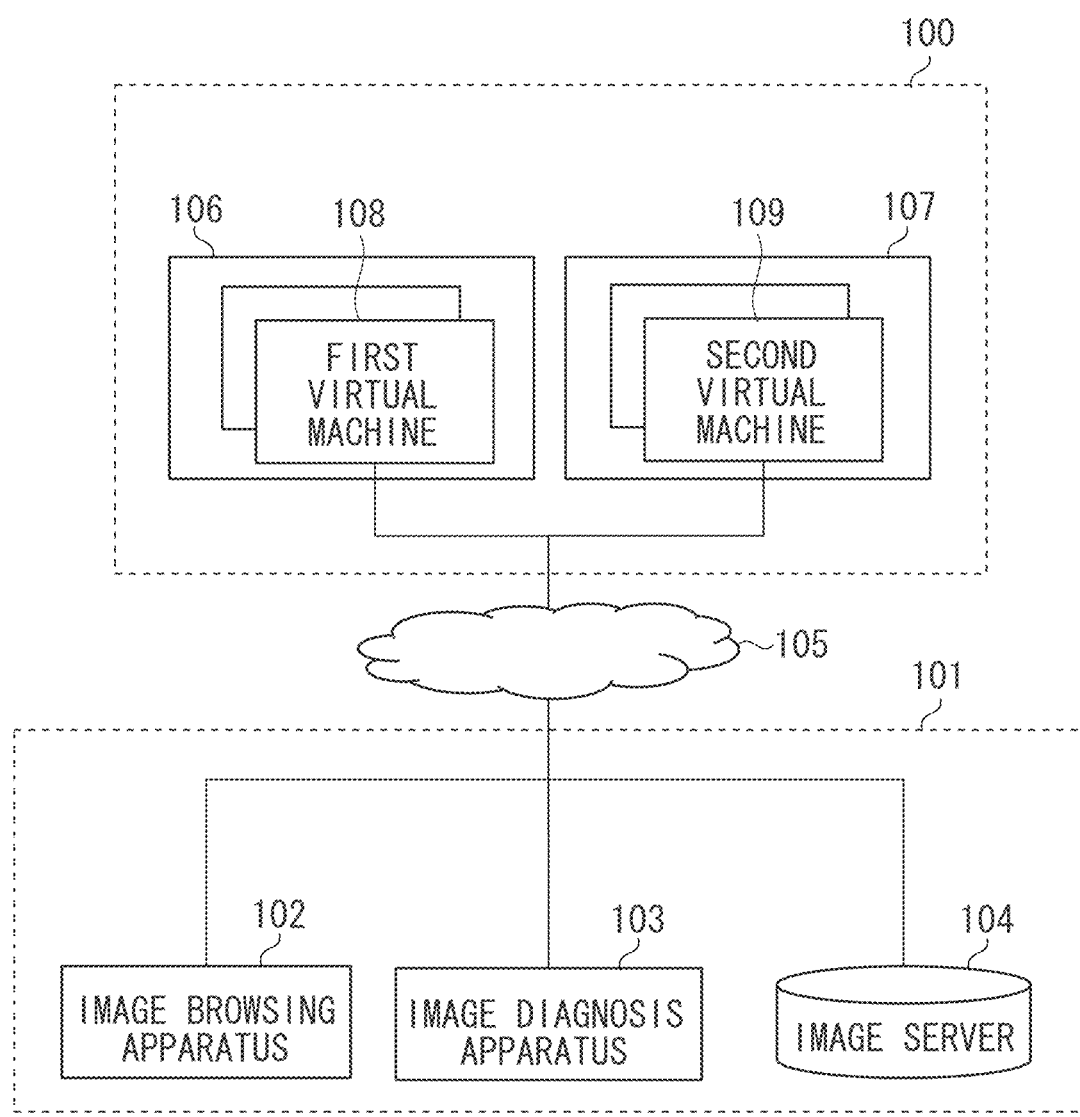
FIG. 7 is a diagram illustrating an example of a system configuration of an image analysis system according to a fourth exemplary embodiment.

FIG. 7 is a diagram illustrating an example of a system configuration of an image analysis system according to the present exemplary embodiment.

A public cloud system 100 includes a plurality of types of virtual machines that is a plurality of types of virtualized physical machines managed by a cloud provider. Each virtual machine is connected to the Internet 105.

An in-hospital system 101 includes an image browsing apparatus 102 and an image diagnosis apparatus 103, which are connected to an in-hospital network that enables mutual communication therebetween. The in-hospital network is also connected to a network such as the Internet 105. The in-hospital network is configured so that the apparatuses 102 and 103 can access the Internet 105.

The image browsing apparatus 102 enables an operator, such as a doctor, to display images formed by the image diagnosis apparatus 103 (details will be described below) and perform image analysis.

Examples of the image diagnosis apparatus 103 include a CT apparatus or an MRI apparatus. Images formed by the image diagnosis apparatus 103 (typically formed by processing called image reconstruction) are transmitted from the image diagnosis apparatus 103 to an image server 104 (details will be described below) for storage.

The image server 104 stores the images formed by the image diagnosis apparatus 103. The image server 104 performs transmission and preservation processing of the stored images based on requests received from the image browsing apparatus 102 via the in-hospital network.

The Internet 105 serves as a data communication path between the public cloud 100 and the in-hospital system 101.

A first virtual machine group 106 is a set of first virtual machines 108 (details will be described below). The first virtual machine group 106 is usable based on a use start request from the image browsing apparatus 102 to the cloud provider and to end being used according to a use end request. Use fees occur at predetermined intervals while the first virtual machine group 106 continues to be used.

A second virtual machine group 107 is a set of second virtual machines 109 (details will be described below) of processor type and performance different from the first virtual machines 108. The second virtual machine group 107 is also configured so that its entities are realized according to a use start request from the image browsing apparatus 102 and released according to a use end request. Use fees occur at predetermined intervals while the second virtual machine group 107 continues to be used from start to end of use. The use fees are set by the cloud provider, independent of those of the first virtual machine group 106.

The virtual machines 108 are realized entities belonging to the first virtual machine group 106. The virtual machines 109 are realized entities belonging to the second virtual machine group 107.

Figure 8:
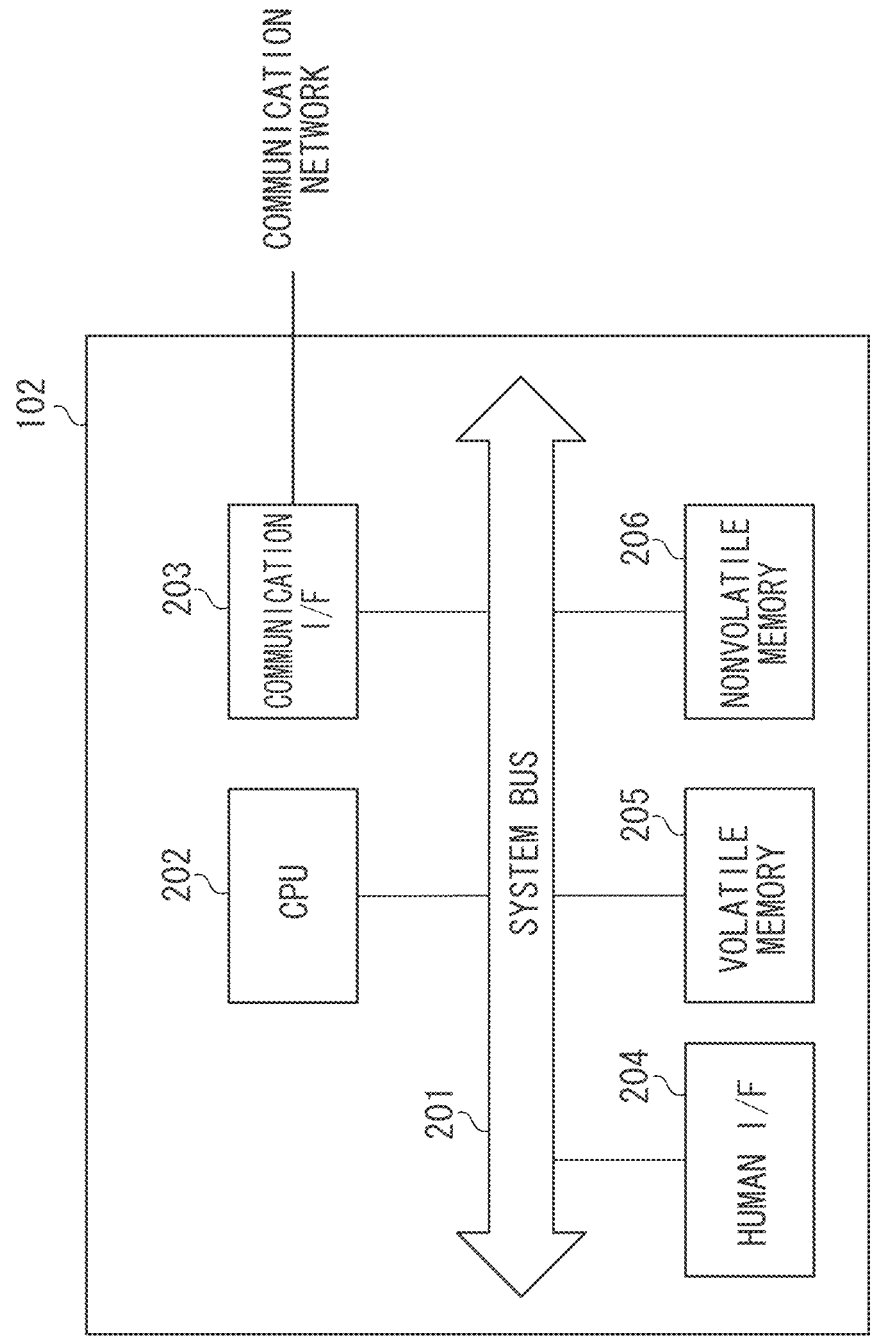
FIG. 8 is a diagram illustrating an example of a hardware configuration of an image browsing apparatus according to the fourth exemplary embodiment.

FIG. 8 is a diagram illustrating an example of a hardware configuration of the image browsing apparatus 102 according to the present exemplary embodiment. The hardware configuration of FIG. 8 is similar to that of FIG. 2.

A system bus 201 is a communication path for exchanging data between hardware components.

A CPU 202 executes a program and controls functional units.

A communication I/F 203 is connected to the in-hospital network and the Internet 105.

A human I/F 204 includes an image data display and operation input functions. Examples of the human I/F 204 include a touch panel, a keyboard, and a display.

A volatile memory 205 is used to temporarily store image analysis programs and image data. Examples of the volatile memory 205 include a DRAM.

A nonvolatile memory 206 stores image analysis programs. Examples of the nonvolatile memory 206 include an HDD.

Figure 10:
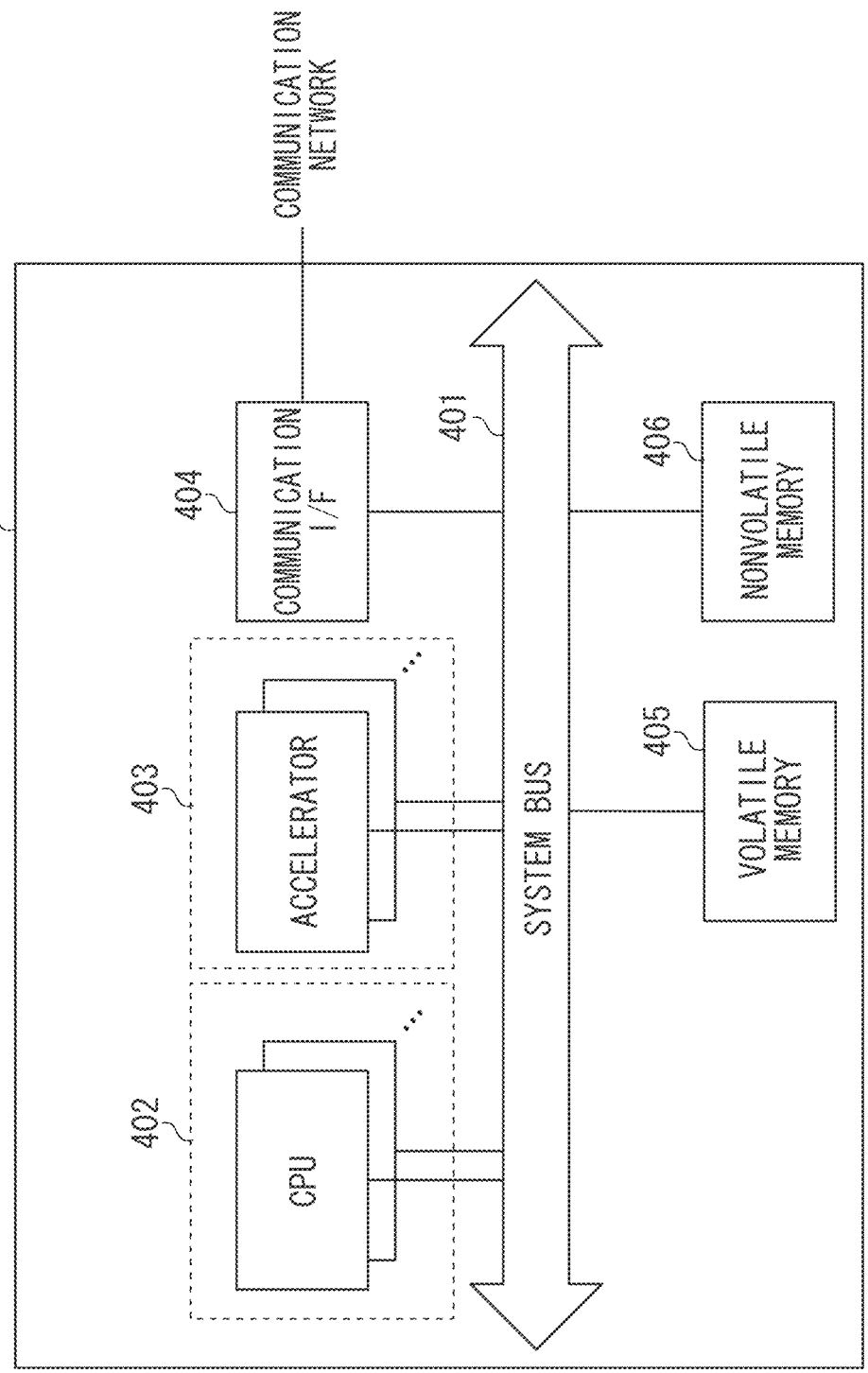
FIG. 10 is a diagram illustrating an example of a hardware configuration of first and second virtual machines according to the fourth exemplary embodiment.

FIG. 10 is a diagram illustrating an example of a hardware configuration of the first and second virtual machines 108 and 109. In the present exemplary embodiment, the first and second virtual machines 108 and 109 differ in the number of CPUs and the presence or absence of a GPU. For ease of description, the first and second virtual machines 108 and 109 will be described by using the same diagram.

A system bus 401 is a communication path for hardware components.

Arithmetic units 402, such as a CPU, execute a program. In the present exemplary embodiment, a first virtual machine 108 includes two CPUs. A second virtual machine 109 includes 32 CPUs. However, such a configuration is not restrictive.

An arithmetic unit 403, such as a GPU, executes a program written in a programming language different from that of the CPUs. In the present exemplary embodiment, the first virtual machine 108 does not include a GPU. The second virtual machine 109 includes a GPU.

A communication I/F 404 is connected to communication networks, such as a network inside the public cloud 100 and the Internet 105.

A volatile memory 405, such as a DRAM, is used to temporarily store an image analysis program and image data.

A nonvolatile memory 406, such as an HDD, stores a plurality of programs intended for image analysis. The plurality of image analysis programs includes image analysis programs for the same purpose, which are each tuned according to the number and types of pieces of hardware for execution.

Figure 11:
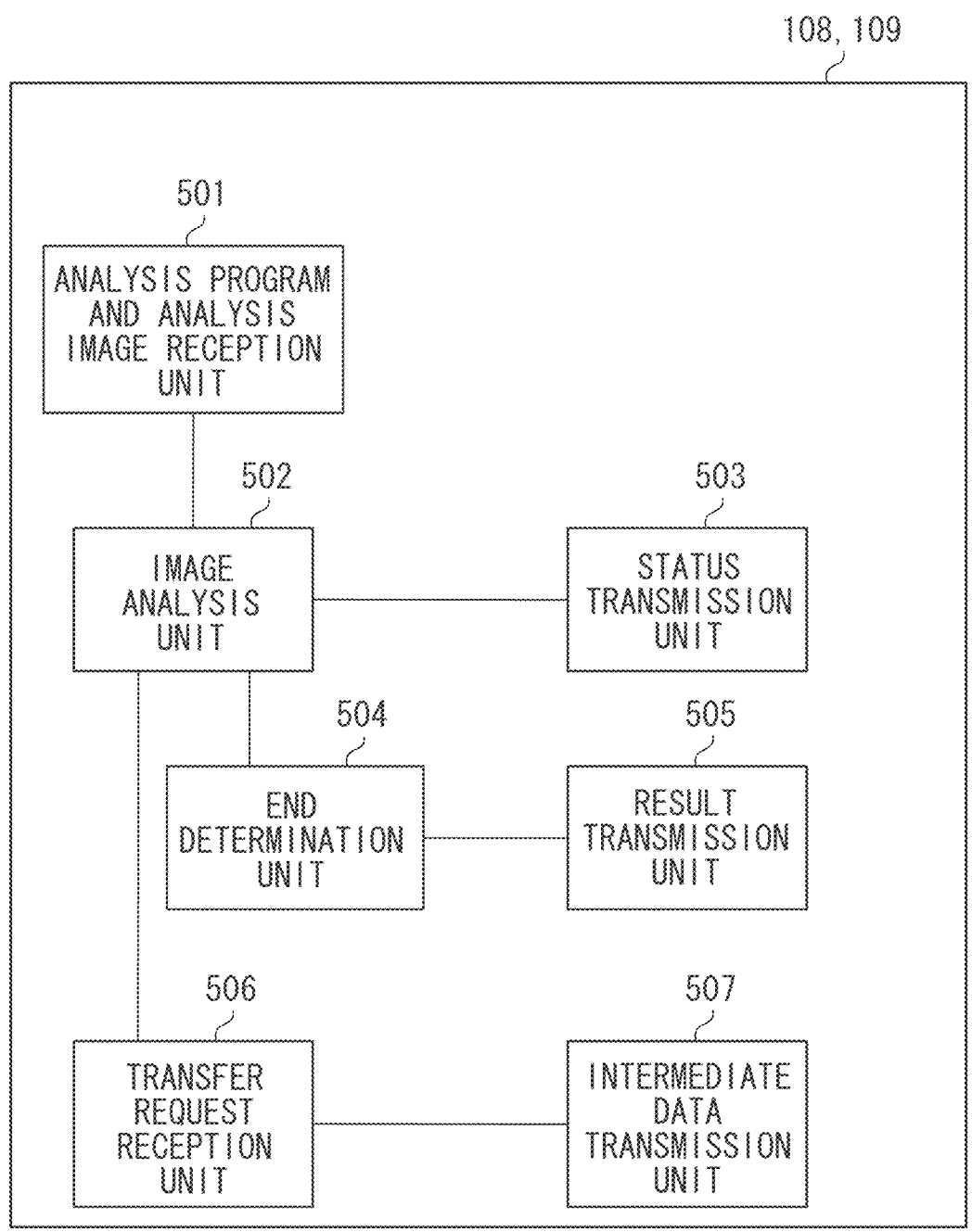
FIG. 11 is a diagram illustrating a virtual machine and functional blocks of the virtual machine according to the fourth exemplary embodiment.

FIG. 11 is a diagram illustrating functional blocks (functional units) of the first and second virtual machines 108 and 109. Functional blocks of a typical virtual machine, which are not needed for the description of the present exemplary embodiment, are omitted. The functional units are implemented by executing by at least one CPU 402 a program stored in one or more of the memories, such as the DRAM 405 and the HDD 406.

An analysis program and analysis image reception unit 501 receives an analysis image or images specified by, for example, a doctor and an image analysis program corresponding to analysis processing from the image browsing apparatus 102 via the Internet 105.

An image analysis unit 502 executes the image analysis program received by the analysis program and analysis image reception unit 501 on the analysis image(s) received by the image analysis program and analysis image reception unit 501.

A status transmission unit 503 transmits a status of progress of the image analysis performed by the image analysis program to the image browsing apparatus 102. For example, for the status of progress, the image analysis program calculates and transmits a rate of progress to the status transmission unit 503. The status of progress can include different definitions based on the type of the algorithm employed for the image analysis. For example, in the case of registration in which an evaluation value such as an image similarity is optimized by a gradient method, the status of progress can be calculated from a ratio between the number of times of convergence in the past and the number of repetitions at the current point in time. Alternatively, the status of progress can be calculated by comparison with a previously-prepared model that expresses how an evaluation value decreases according to the number of repetitions. The present exemplary embodiment is not limited to any particular method for calculating the status of progress of the image analysis program.

An end determination unit 504 determines whether the image analysis ends.

If the image analysis ends, a result transmission unit 505 transmits a result of the image analysis (image analysis processing).

A transfer request reception unit 506 monitors whether a transfer request for a virtual machine is received from the image browsing apparatus 102. If a transfer request is received, the transfer request reception unit 506 interrupts the image analysis.

If a transfer request is received, an intermediate data transmission unit 507 transmits intermediate data to the destination virtual machine.

Figure 12:
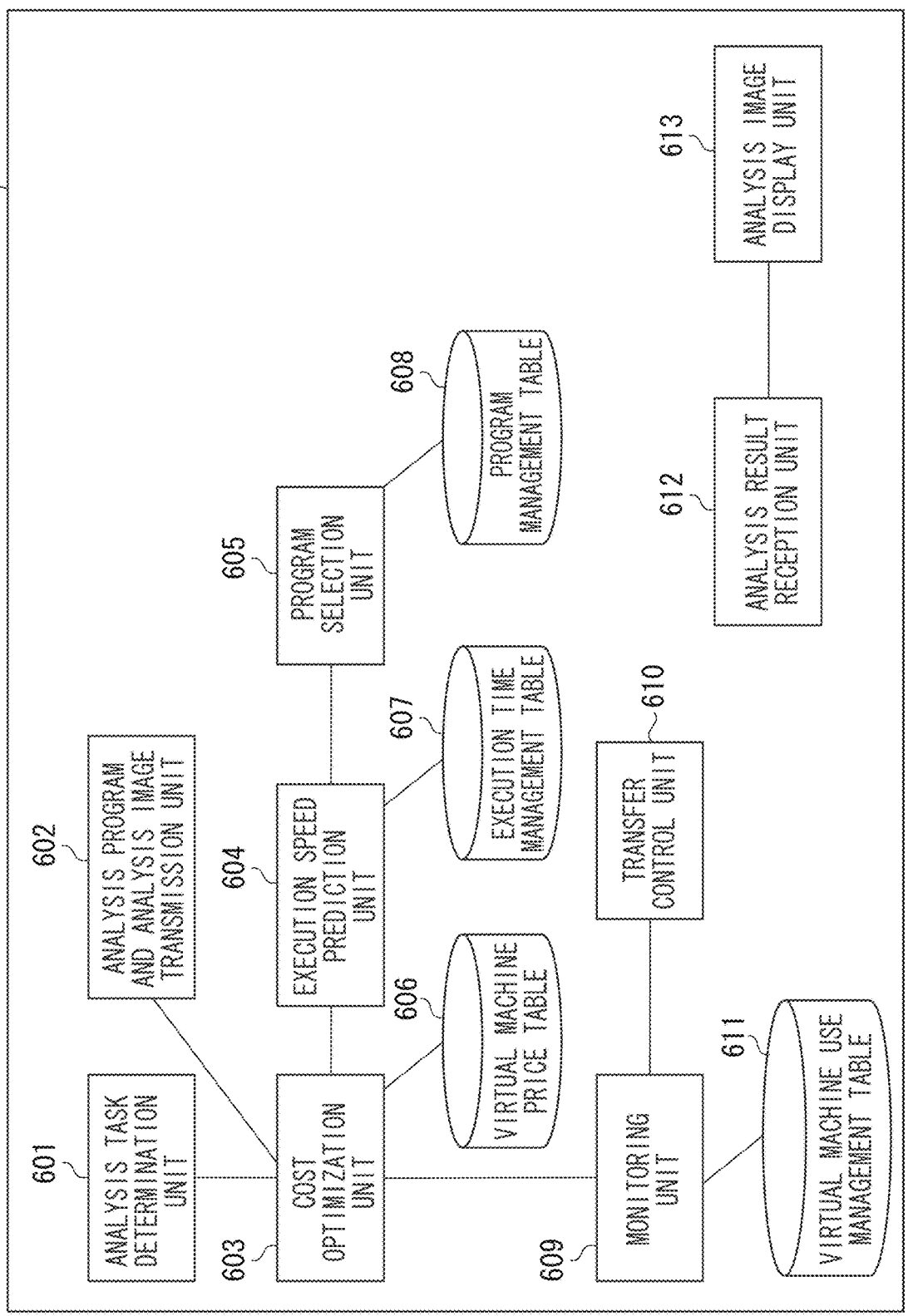
FIG. 12 is a diagram illustrating an example of functional blocks of the image browsing apparatus according to the fourth exemplary embodiment.

FIG. 12 is a diagram illustrating functional blocks (functional units) of the image browsing apparatus 102 according to the present exemplary embodiment. Functional blocks of a typical image browsing apparatus, which are not needed for the description of the present exemplary embodiment, are omitted. The functional units are implemented by executing by at least one CPU 202 a program stored in one or more of the memories, such as the DRAM 205 and the HDD 206.

An analysis task determination unit 601 determines an image or images to be analyzed (analysis image(s)), an analysis technique, and an upper limit of execution time thereof. The analysis task determination unit 601 presents options to an operator that the operator uses to makes determinations.

Figure 9:
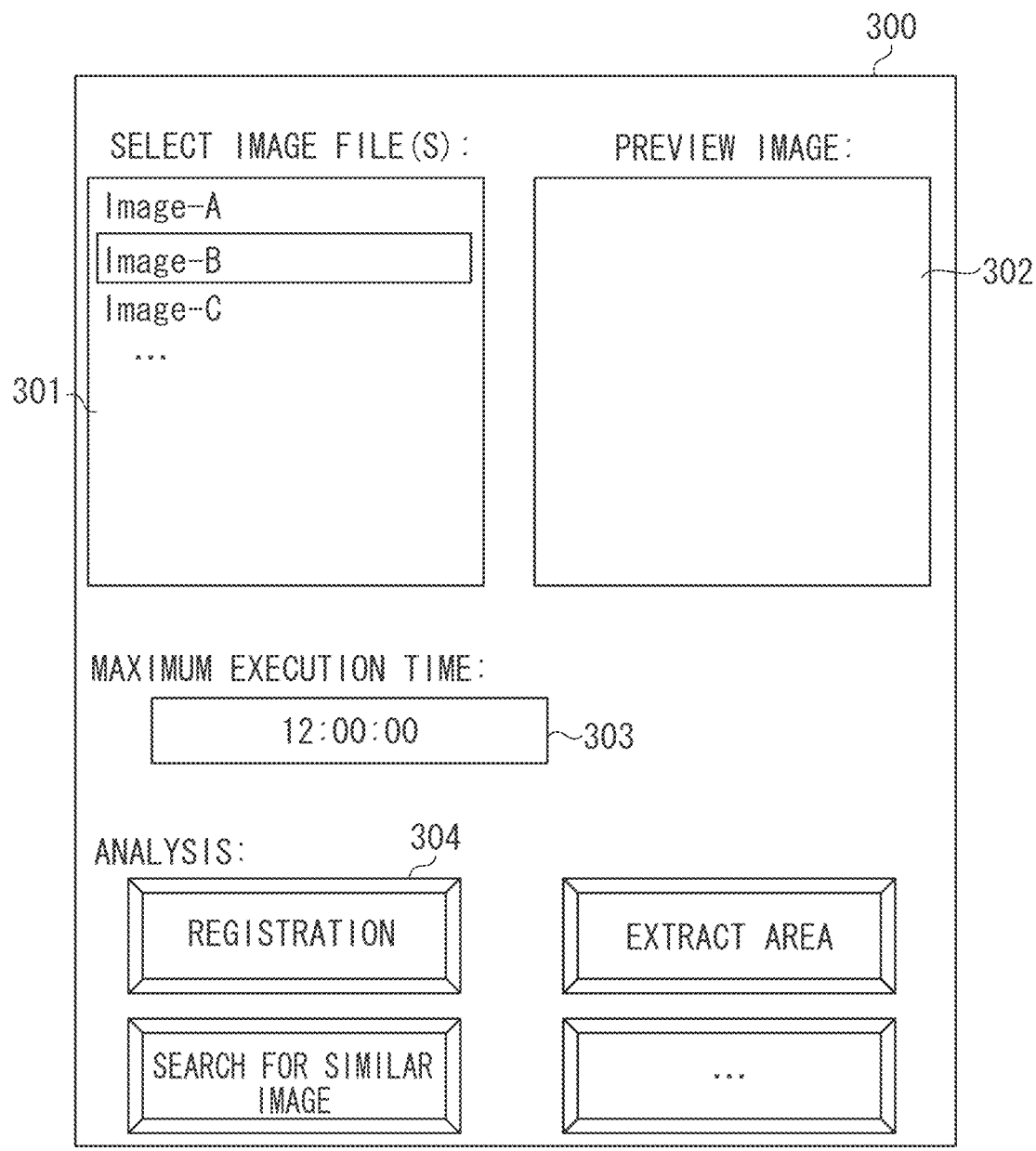
FIG. 9 is a diagram illustrating an example of a screen displayed on a human interface during execution of an analysis task determination unit according to the fourth exemplary embodiment.

A screen for selecting a file(s) and an image analysis method will be described with reference to FIG. 9. FIG. 9 is a diagram illustrating an example of a screen displayed on the human I/F 204 during execution of the analysis task determination unit 601 according to the present exemplary embodiment.

An image file selection area 301 lists the names of images stored in the image server 104. The operator can set a plurality of images into a selected state by operating the human I/F 204.

A preview area 302 is an area for displaying the last image selected in the image selection area 301. The operator can observe a visual representation of image data corresponding to the image name.

An area 303 is intended to specify a deadline, i.e., the upper limit of execution time. The operator can specify an arbitrary value.

Buttons (analysis buttons) 304 provide instructions to execute an analysis. The operator can select a desired analysis technique. When a button 304 is pressed, analysis processing displayed on the button 304 is started on the image(s) selected in the image file selection area 301 with the upper limit of execution time specified in the area 303.

Returning to the description of FIG. 12, an analysis program and analysis image transmission unit 602 transmits an image analysis program determined by a program selection unit 605, described below, and the analysis image(s) determined by the analysis task determination unit 601 to a virtual machine determined by a cost optimization unit 603, described below.

The cost optimization unit 603 determines predicted values of execution speed of the determined analysis task by respective virtual machines. The cost optimization unit 603 determines a cost-optimum virtual machine from among virtual machines that can complete the analysis task before the deadline, based on the prices of the virtual machines. In the present exemplary embodiment, a cost-optimum virtual machine refers to a virtual machine that completes the execution of the analysis task before the deadline of the analysis task and of which the use cost is suppressed to be the lowest. A cost-optimum virtual machine does not necessarily need to be the virtual machine the use cost of which is suppressed to be the lowest, and can refer to a virtual machine the use cost of which is suppressed to be cheaper in amount than that of the currently used virtual machine.

An execution speed prediction unit 604 predicts the execution time of a program for performing specified analysis processing when a specified virtual machine is used. In the present exemplary embodiment, the execution speed prediction unit 604 makes predictions by using past records of execution time.

If there is a plurality of image analysis programs for performing specified analysis processing, a program selection unit 605 selects an image analysis program that can be executed at the highest speed based on the characteristics of the virtual machine. The selected image analysis program does not necessarily need to be the fastest one for the virtual machine. The program selection unit 605 can select an image analysis program that can complete the analysis task before the deadline.

A virtual machine price table 606 associates the types of virtual machines with the use fees thereof. The cost optimization unit 603 uses the virtual machine price table 606 when performing cost optimization. The virtual machine price table 606 is stored in the nonvolatile memory 206 in advance. If the cloud provider updates the prices, the virtual machine price table 606 is also updated. The CPU 202 is preferably configured to monitor price information provided by the cloud provider.

FIG. 13A illustrates an example of the virtual machine price table 606. The virtual machine price table 606 stores the types of virtual machines, various arithmetic functions, memory amounts, the presence or absence of an accelerator, storage capacities, use fees, and the timing of occurrence of use fees. Such items are merely examples, and relevant information other than the illustrated items can be included.

Returning to the description of FIG. 12, an execution time management table 607 records the execution times of image analysis programs executed by virtual machines in the past. The CPU 202 can update the execution time management table 607 each time an image analysis program is executed. The CPU 202 can use a fixed execution time management table 607 measured in advance. The execution time management table 607 is stored in the nonvolatile memory 206.

FIG. 13D illustrates an example of the execution time management table 607. The execution time management table 607 records all the execution times in the past in association with the types of the programs and the types of the virtual machines.

Returning to the description of FIG. 12, a program management table 608 manages a plurality of image analysis programs prepared in advance. The program management table 608 is stored in the nonvolatile memory 206. The program selection unit 605 uses the program management table 608 when selecting an image analysis program to be run on a virtual machine from among the image analysis programs.

FIG. 13B illustrates an example of the program management table 608. The program management table 608 associates the image processing programs with operation environments thereof.

Returning to the description of FIG. 12, a monitoring unit 609 monitors a status of execution of an analysis program by a virtual machine. The monitoring unit 609 performs cost optimization based on the monitored status, and determines whether to transfer the task (perform transfer processing).

When the monitoring unit 609 determines to transfer the task, a transfer control unit 610 performs control to take over an analyzed portion from the virtual machine executing the image analysis program and run the image analysis program on a new virtual machine. Specifically, the transfer control unit 610 performs a use start procedure of the virtual machine to transfer the task to and transmits the image processing program. The transfer control unit 610 then extracts intermediate data needed to continue the image analysis program from the virtual machine to transfer the task from and transfers the intermediate data to the new virtual machine.

A virtual machine use management table 611 associates each piece of currently-executed analysis processing with the executing virtual machine. The virtual machine use management table 611 is updated upon execution or an end of analysis processing. The virtual machine use management table 611 is stored in the volatile memory 205.

FIG. 13C illustrates an example of the virtual machine use management table 611. The virtual machine use management table 611 associates the type of the virtual machine, the image(s) to be analyzed, the start time of use, the state of the image analysis program, the use fee, and the timing of occurrence of the use fee with respect to each virtual machine in use.

Returning to the description of FIG. 12, an analysis result reception unit 612 receives an analysis result of an image analysis program executed by a virtual machine.

An analysis image display unit 613 displays the analysis result on the human I/F 204.

Figure 18:
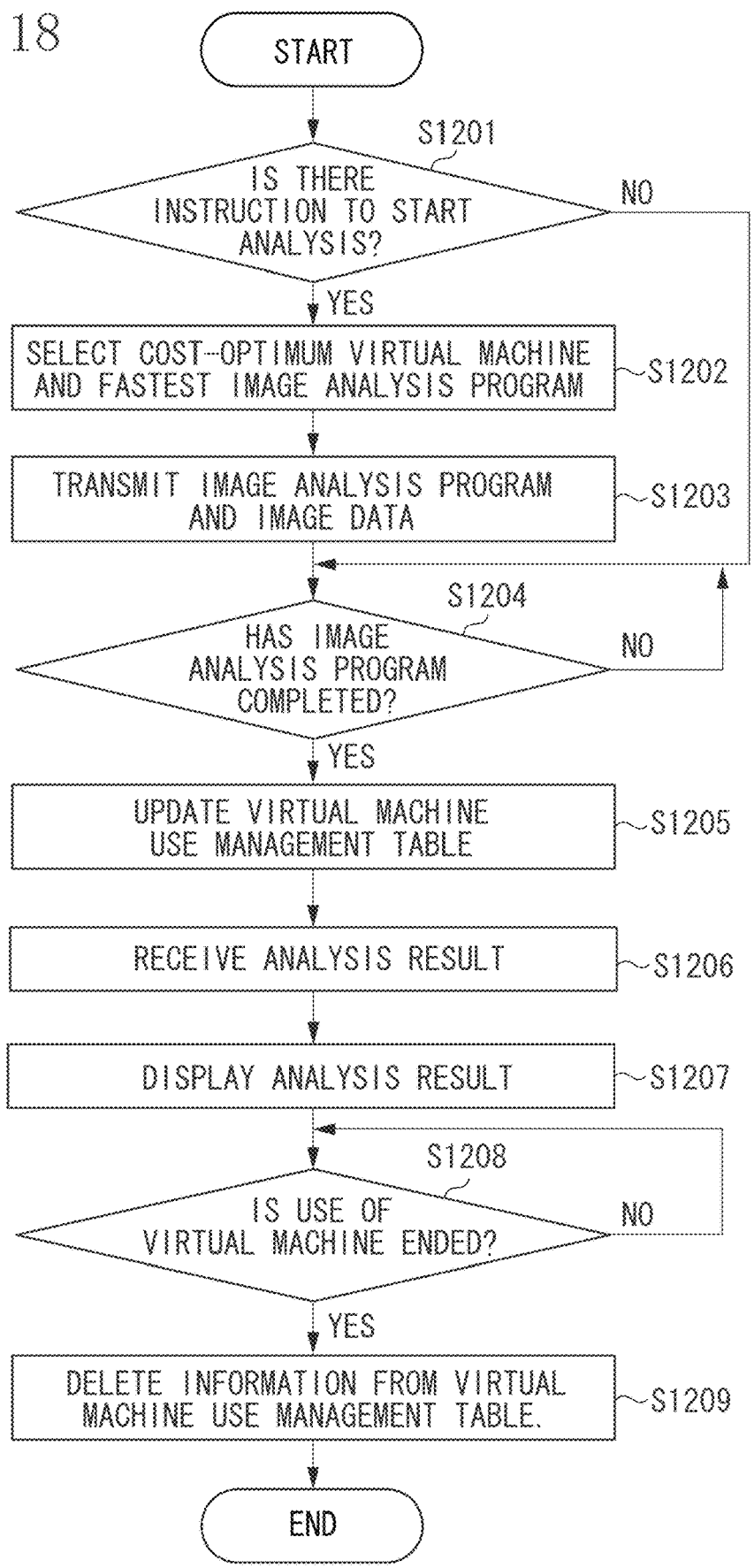
FIG. 18 is a flowchart illustrating an example of an outline of image analysis processing in the processing performed by the image browsing apparatus according to the fourth exemplary embodiment.

Processing of the image browsing apparatus 102, or a series of flows from selection of images by the analysis task determination unit 601 to display of an image of an analysis result by the analysis image display unit 613, will be briefly described with reference to FIG. 18. FIG. 18 is a flowchart illustrating an outline of image analysis processing performed by the image browsing apparatus 102.

In step S1201, the image browsing apparatus 102 determines whether there is an instruction to start an analysis. If there is such an instruction (YES in step S1201), the processing proceeds to step S1202. The instruction to start an analysis is provided by pressing an analysis button 304. If there is no such instruction (NO in step S1201), the processing proceeds to step S1204.

In step S1202, the image browsing apparatus 102 selects a cost-optimum virtual machine and an image analysis program that runs fastest on the virtual machine. In the present exemplary embodiment, the image browsing apparatus 102 selects the cost-optimum virtual machine from idle virtual machines that ended image analysis programs and new usable virtual machines. When starting to use a new virtual machine, the image browsing apparatus 102 requests a use start from the cloud provider. The virtual machine use management table 611 can be searched for virtual machines that ended image analysis programs. The virtual machine price table 606 can be searched for new virtual machines. The execution time management table 607 can be searched for image analysis programs that are the fastest on the respective virtual machines and predicted values of execution time thereof.

In step S1203, the image browsing apparatus 102 transmits the image analysis program selected in step S1202 and image data to be analyzed to the virtual machine selected in step S1202.

In step S1204, the image browsing apparatus 102 determines whether the image analysis program transmitted in step S1203 has completed. Specifically, the image browsing apparatus 102 repeats step S1204 until an end notification of the image analysis program comes. If the image analysis program has completed (YES in step S1204), the processing proceeds to step S1205.

In step S1205, the image browsing apparatus 102 updates the virtual machine use management table 611 with the information that the task is completed. Such control makes the virtual machine available in subsequent cost optimization until use fee occurs next time.

In step S1206, the image browsing apparatus 102 receives an analysis result analyzed by the image analysis program.

In step S1207, the image browsing apparatus 102 displays the analysis result on the human I/F 204.

In step S1208, the image browsing apparatus 102 determines whether the use of the virtual machine selected in step S1202 has ended. Specifically, the image browsing apparatus 102 repeats step S1208 until a notification of the end of use of the virtual machine comes. If the use of the virtual machine ends (YES in step S1208), the processing proceeds to step S1209.

In step S1209, the image browsing apparatus 102 deletes the information about the ended virtual machine from the virtual machine use management table 611.

Figure 14:
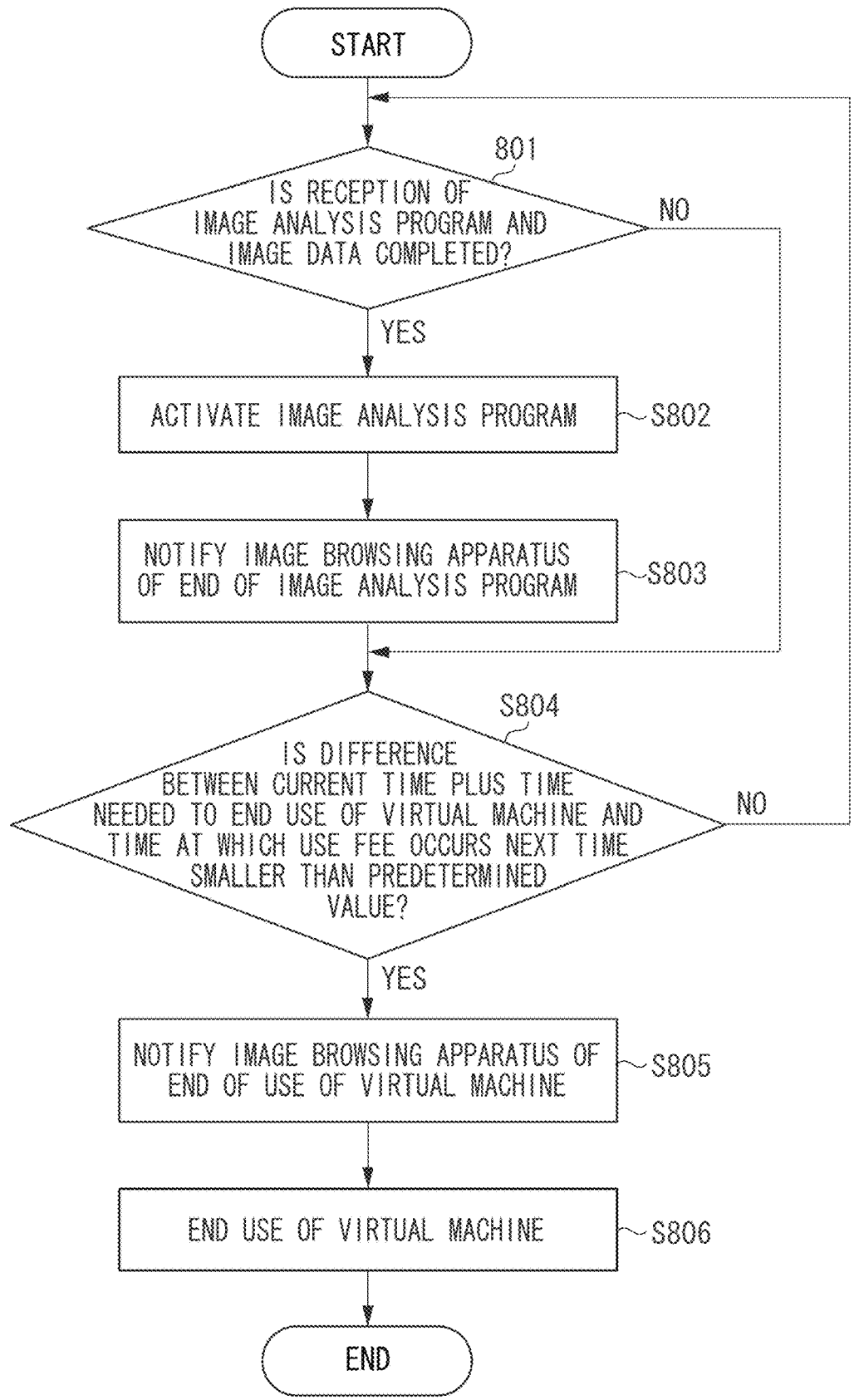
FIG. 14 is a flowchart illustrating an example of a processing flow of the virtual machines according to the fourth exemplary embodiment.

FIG. 14 is a flowchart for describing a processing flow of the functional blocks of a virtual machine described in FIG. 11, where use start processing of the virtual machine is already completed.

In step S801, the virtual machine determines whether receipt of an image analysis program and image data to be processed from the image browsing apparatus 102 is completed. If receipt is completed (YES in step S801), the processing proceeds to step S802. If receipt has not yet been completed (NO in step S801), the processing proceeds to step S804.

In step S802, the virtual machine activates the received image analysis program, with the received image data as a target. If the image analysis program ends, the processing proceeds to step S803.

The processing of an image analysis program will be described with reference to FIGS. 15A and 15B.

Figure 15A:
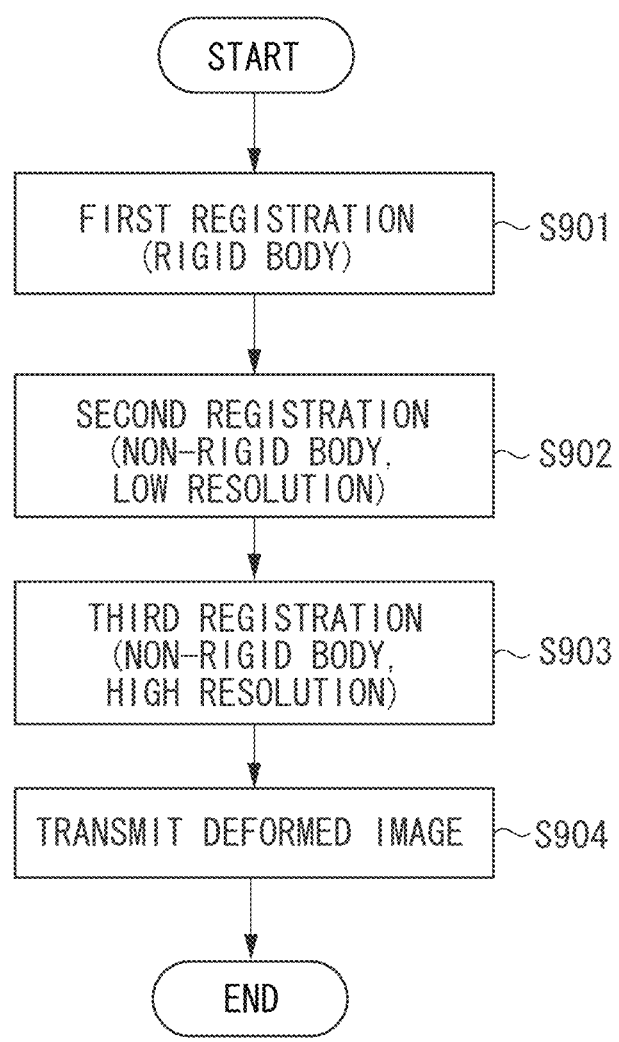
FIG. 15A is a flowchart illustrating an example of an outline of an image analysis program for performing image registration according to the fourth exemplary embodiment.
Figure 15B:
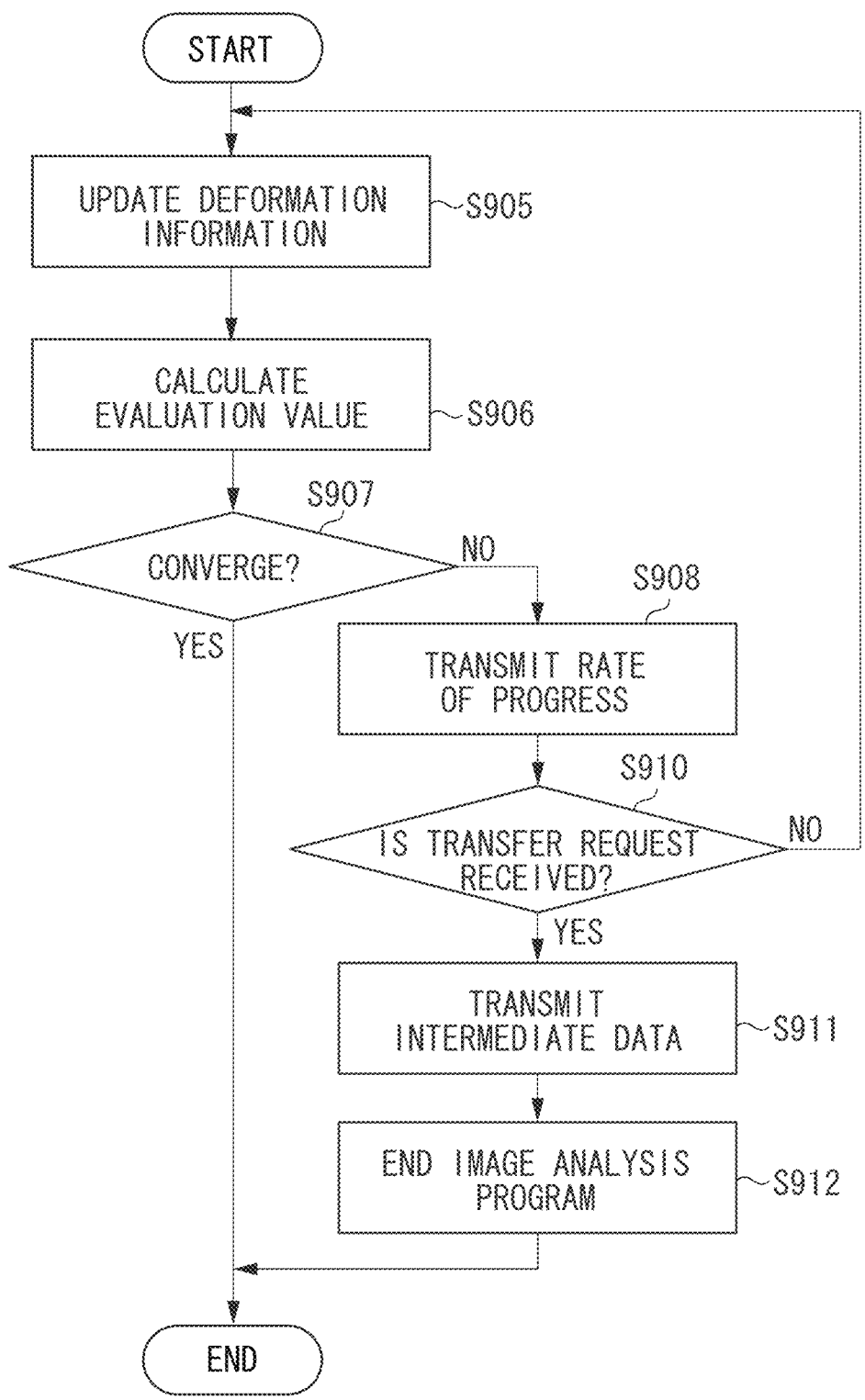
FIG. 15B is a flowchart illustrating an example of details of registration processing.

FIG. 15A is a flowchart illustrating an outline of an image analysis program for performing image registration according to the present exemplary embodiment. The image analysis program is executed when the user presses the analysis button corresponding to registration from among the analysis buttons 304.

In step S901, the virtual machine performs rigid body registration.

In step S902, the virtual machine performs non-rigid body registration at low resolution. The virtual machine deforms an input image before registration, based on deformation information determined in step S901.

In step S903, the virtual machine performs non-rigid body registration at high resolution. The virtual machine deforms the input image before registration, based on deformation information determined in step S902.

In step S904, the virtual machine transmits the deformed image. The virtual machine deforms the input image using deformation information determined in step S903, and transmits the resultant to the image browsing apparatus 102.

As described in steps S901, S902, and S903, the registration processing according to the present exemplary embodiment is designed to perform registration by using a plurality of techniques so that the accuracy increases stepwise. Rigid body registration that involves a small amount of calculation, but is not capable of complicated deformation, is performed first. Non-rigid body registration that takes a long time to calculate, but is capable of complicated deformation, is then performed at low resolution and at high resolution in succession. Deformation information determined by each registration technique is used for the deformation of the input image by the next registration technique.

The detailed registration processing contents of steps S901, S902, and S903 will be described with reference to the flowchart illustrated in FIG. 15B by using a typical repetitive registration technique as a model.

In step S905, the virtual machine updates deformation information. The virtual machine calculates and reflects an update amount on the deformation information. A method for calculating the update amount can be defined in various ways depending on the registration technique, and is not limited to a particular method.

In step S906, the virtual machine evaluates registration accuracy. The virtual machine calculates an evaluation value of the deformation information updated in step S905.

In step S907, the virtual machine determines whether the evaluation value converges. If a change in the evaluation value is small (YES in step S907), the processing ends. If not (NO in step S907), the processing proceeds to step S908.

In step S908, the virtual machine transmits a rate of progress. The virtual machine calculates the rate of progress from the evaluation value determined in step S906, and transmits the rate of progress to the image browsing apparatus 102.

In step S910, the virtual machine determines whether a transfer request for the image analysis program is received. If there is a transfer request from the image browsing apparatus 102 (YES in step S910), the processing proceeds to step S911. If not (NO in step S910), the processing proceeds to step S905.

In step S911, the virtual machine performs processing for transmitting intermediate data of the image analysis program. The virtual machine transmits deformation information needed to continue the registration processing. The intermediate data of the image analysis program varies depending on the type of the image analysis.

In step S912, the virtual machine ends the image analysis program.

Returning to the description of FIG. 14, in step S803, the virtual machine notifies the image browsing apparatus 102 of the end of the image analysis program.

In step S804, the virtual machine determines whether a difference between the current time plus time needed to end the use of the virtual machine and a time at which a use fee occurs next time is less than a predetermined value (for example, 1% of unit use time). This determination prevents a use fee from occurring in the process of ending the use of the virtual machine. If the difference is less (YES in step S804), the processing proceeds to step S805. If not (NO in step S804), the processing proceeds to step S801.

In step S805, the virtual machine notifies the image browsing unit 102 of the end of use of the virtual machine. In step S806, the use of the virtual machine ends.

FIG. 16 is a flowchart illustrating a flow of processing performed by the monitoring unit 609 and the transfer control unit 610 of the image browsing apparatus 102. The monitoring and transfer processing illustrated in FIG. 16 is performed with respect to each image analysis task managed in the virtual machine use management table 611. The present flowchart is executed if the current time is a time determined by subtracting time needed to transfer the task from a predetermined time at which use cost occurs next time in executing the task. Alternatively, the present flowchart is executed if the current time is a predetermined time before, e.g., one minute before or five minutes before, the time determined by subtracting the time needed to transfer the task from the predetermined time at which use fee occurs next time in executing the task.

In step S1001, the image browsing apparatus 102 determines whether a difference between the status of progress of the image analysis program executed by the virtual machine and the status of progress predicted at the previous scheduling time is greater than or equal to a predetermined value. In other words, the image browsing apparatus 102 determines whether the status of progress of the task is poor. In the present exemplary embodiment, in the case of the image registration processing, the image browsing apparatus 102 calculates the status of progress of the task using a comparison value with respect to an average end evaluation value in each stage and a safety coefficient based on the magnitude of a standard deviation of the execution time. If the difference is large (YES in step S1001), the processing proceeds to step S1005. If not (NO in step S1001), the processing proceeds to step S1002.

An average end time and an average evaluation value at the end of processing can be calculated from the execution time management table 607 each time. For efficiency purposes, average end times and average evaluation values can be calculated in advance and stored in the image browsing apparatus 102. An example is a program characteristic management table 701 illustrated in FIG. 13E. Such a table is preferably generated for each combination of an image analysis program and a virtual machine.

In step S1002, the image browsing apparatus 102 determines whether the current time is close to timing at which a use fee of the virtual machine occurs, e.g., within 1% of unit use time. If the current time is close to the timing (YES in step S1002), the processing proceeds to step S1005. If not (NO in step S1002), the processing proceeds to step S1003.

In step S1003, the image browsing apparatus 102 checks whether the image analysis task has ended. If the image analysis task is found to have ended for the first time (YES in step S1003), the processing proceeds to step S1005. If not (NO in step S1003), the processing proceeds to step S1004.

In step S1004, the image browsing apparatus 102 determines whether a predetermined interval has elapsed. The image browsing apparatus 102 compares the current time with the time at which step S1004 is executed before. If a predetermined interval (for example, one minute) has elapsed (YES in step S1004), the processing proceeds to step S1005. If not (NO in step S1004), the processing proceeds to step S1001.

In step S1005, the image browsing apparatus 102 assigns a cost-optimum virtual machine to the image analysis task.

Figure 17A:
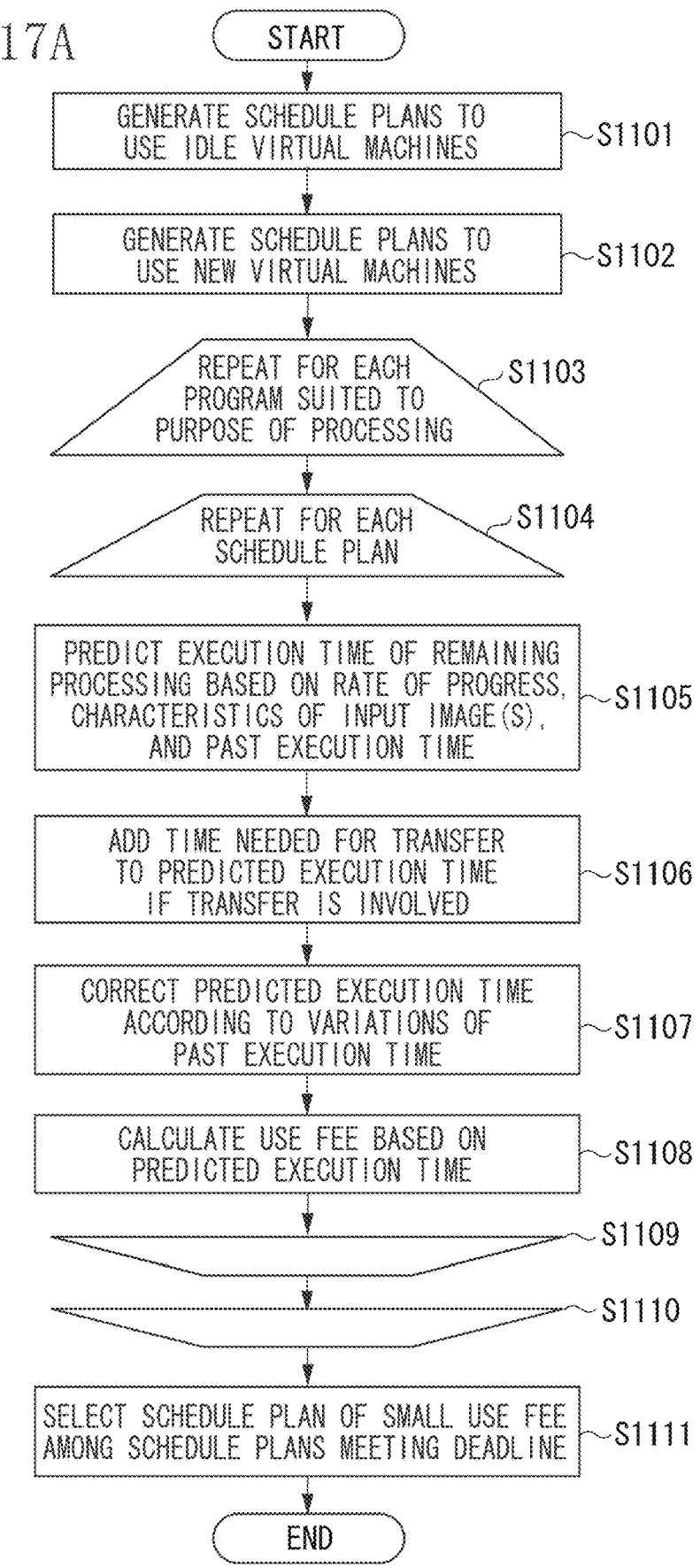
FIG. 17A is a flowchart illustrating an example of cost optimization about an image analysis task in execution in the processing performed by the image browsing apparatus according to the fourth exemplary embodiment.

The processing of step S1005 will be described in detail with reference to FIG. 17A. FIG. 17A is a flowchart for performing cost optimization on the image analysis task in execution according to the present exemplary embodiment.

In step S1101, the image browsing apparatus 102 generates schedule plans to use idle virtual machines. Specifically, the image browsing apparatus 102 refers to the virtual machine use management table 611 and generates schedule plans to use virtual machines that are in use and have completed execution.

In step S1102, the image browsing apparatus 102 generates schedule plans to use new virtual machines. The image browsing apparatus 102 generates schedule plans to be performed by all respective new usable virtual machines. Schedule plans for transferring the image analysis task to other virtual machines at timing at which the use fee changes can be included.

The image browsing apparatus 102 repeats step S1103 for each program suited to the purpose of the processing. The image browsing apparatus 102 repeats step S1103 for all programs suited to the intended use of the image analysis processing to be executed, one by one from among the programs managed in the program management table 608.

The image browsing apparatus 102 repeats step S1104 for each schedule plan generated in step S1101.

In step S1105, the image browsing apparatus 102 predicts the execution time of the remaining processing when the remaining processing is executed by the virtual machine specified by the schedule plan, based on information such as the rate of progress of the image analysis program, characteristics of the input image(s), and past execution time.

In step S1106, if the virtual machine specified by the schedule plan is different from the currently-executing virtual machine, the image browsing apparatus 102 adds time needed for transfer to the predicted execution time determined in step S1105. The time needed for transfer includes time needed to interrupt the processing of the image analysis program in execution, time needed for the transfer processing of intermediate data needed to continue the processing, and time needed to transfer the image data, the intermediate data, and the image analysis program to the new virtual machine. Time needed to start use of the new virtual machine is also included.

In step S1107, the image browsing apparatus 102 corrects the predicted execution time determined in step S1106 based on variations of the past execution time. The larger the variations are, the higher the safety coefficient used for correction is. The image browsing apparatus 102 uses the standard deviation of the execution time stored in the program characteristic management table 701, multiplied by a predetermined coefficient.

In step S1108, the image browsing apparatus 102 calculates the use fee of the virtual machine based on the predicted execution time. The image browsing apparatus 102 calculates the use fee by referring to the virtual machine price table 606 and integrating use fees each time a use fee occurs.

In step S1109, the processing returns to step S1104.

In step S1110, the processing returns to step S1103.

In step S1111, the image browsing apparatus 102 determines whether there is a schedule plan meeting the deadline from among the schedule plans. If there is determined to be a schedule plan or plans that meet the deadline, the image browsing apparatus 102 selects a schedule plan of a small use fee from among the schedule plans.

Returning to the description of FIG. 16, in step S1006, the image browsing apparatus 102 determines whether the assigned virtual machine is changed. If the assigned cost-optimum virtual machine determined in step S1005 is different from the virtual machine currently executing the image analysis program (YES in step S1006), the processing proceeds to step S1007. If not (NO in step S1006), the processing returns to step S1001.

In step S1007, the image browsing apparatus 102 transfers the image analysis task to the assigned virtual machine. Details of the processing of step S1007 will be described below with reference to FIG. 17B. After the completion of the processing of step S1007, the processing returns to step S1001.

FIG. 17B is a flowchart for transferring the image analysis task to the assigned virtual machine according to the present exemplary embodiment.

In the present exemplary embodiment, steps S1112 and S1114 are started in parallel.

In step S1112, the image browsing apparatus 102 starts using the destination virtual machine. The image browsing apparatus 102 communicates with a virtual machine management system (not illustrated) of the provider of the public cloud 100 to assign the virtual machine and activate a virtual operating system (OS).

In step S1113, the image browsing apparatus 102 determines whether the activation of the virtual machine is completed. The image browsing apparatus 102 repeats the determination until the activation is completed. If the activation is completed (YES in step S1113), the processing proceeds to step S1116.

In step S1114, the image browsing apparatus 102 transmits a transfer request to the virtual machine executing the image analysis task. As described above, if such a request is provided, the virtual machine interrupts the image analysis processing and transmits intermediate data needed to continue the image analysis processing to the image browsing apparatus 102.

In step S1115, the image browsing apparatus 102 receives the intermediate data from the virtual machine. After the completion of the reception of the intermediate data, the processing proceeds to step S1116.

Triggered by the completion of both steps S1113 and S1115, the image browsing apparatus 102 starts step S1116. In step S1116, the image browsing apparatus 102 transmits the image data, the intermediate data received in step S1114, and the program selected in step S1111 to the destination virtual machine.

Based on the above-described processing, a virtual machine cost-optimum for the remaining processing is selected each time the image analysis task progresses. If the virtual machine needs to be changed, transfer control is performed. This enables improvement in efficiency.

In transferring the image analysis task to another virtual machine, the intermediate data of the image analysis is transferred. Such a characteristic control enables continuation of the processing by image analysis programs that are intended for the same purpose, but different in implementation. In the present exemplary embodiment, there is provided a plurality of image analysis programs for the same purpose, and a relatively fast image analysis program is selected for each virtual machine. The provision of such a characteristic control reduces the use time of the virtual machines and provides for improvement in efficiency.

Even if a virtual machine completes executing an image analysis program, the end processing of the virtual machine is not performed until immediately before a use fee of the virtual machine occurs. By such a characteristic control, the virtual machine can be utilized for another image analysis task with still further improvement in efficiency.

Modification of Fourth Exemplary Embodiment

In the fourth exemplary embodiment, the image browsing apparatus 102 is described to include the cost optimization unit 603, the execution speed prediction unit 604, the program selection unit 605, the monitoring unit 609, and the transfer control unit 610. However, such functions can be included in a virtual machine that preforms image analysis. This can reduce the processing load of the image browsing apparatus 102. In such a case, the flow of FIG. 17A is executed immediately after the determination of the rate of progress in step S908. In another configuration, a dedicated virtual machine that executes the flow of FIG. 17A can be provided aside from virtual machines for image analysis.

In the fourth exemplary embodiment, the execution time is described to be predicted based on the records of past execution time. However, if there is no record of past execution time, the records of a virtual machine having similar hardware characteristics can be used. In such a case, a value calculated based on a ratio to the number of times of calculation per second or a memory transfer band of a similar virtual machine is diverted.

In the fourth exemplary embodiment, the image registration processing is described as an example of the target of image analysis. Similar control can be applied to other types of image analysis processing, whereas the method for calculating the progress varies depending on the method of image analysis.

Exemplary embodiments can be implemented, for example, as a system, an apparatus, a method, a program, and a storage medium. Specifically, an exemplary embodiment can be applied to a system including a plurality of devices, or an apparatus including a single device.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-234099, filed Dec. 1, 2016, which is hereby incorporated by reference herein in its entirety.

What is claimed is:

1. An information processing apparatus that communicates with a plurality of servers in which use cost occurs periodically in executing a task, the information processing apparatus comprising:
   a memory storing instructions; and
   one or more processors which, by executing the instructions, configure the one or more processors to:
   obtain information indicating progress of the task from a first server executing the task;
   determine, based on the obtained information at timing based on a predetermined time at which the use cost occurs and time needed to transfer the task, whether the progress of the task is delayed;
   select a second server with a higher throughput than that of the first server if it is determined that the progress of the task is delayed; and
   instruct the selected second server to execute the task.

2. The information processing apparatus according to claim 1, wherein the timing is a time determined by subtracting the time needed to transfer the task from the predetermined time at which the use cost occurs.

3. The information processing apparatus according to claim 1, wherein execution of the instructions further configures the one or more processors to select a server that can complete the task by a predetermined time limit as the second server.

4. The information processing apparatus according to claim 1,
   wherein the task is performing image processing a plurality of times, and
   wherein execution of the instructions further configures the one or more processors to obtain the information indicating the progress of the task each time the image processing is performed.

5. The information processing apparatus according to claim 1, wherein execution of the instructions further configures the one or more processors to instruct the first server to transmit information needed to execute the task.

6. The information processing apparatus according to claim 1, wherein execution of the instructions further configures the one or more processors to transmit a program according to an environment of the first server to the selected second server.

7. The information processing apparatus according to claim 6, wherein the environment is a hardware configuration of the first server.

8. The information processing apparatus according to claim 6, wherein the program is a program that runs fastest in the environment.

9. The information processing apparatus according to claim 1, wherein the progress indicated by the information is an evaluation value of an execution result of the task.

10. The information processing apparatus according to claim 1, wherein the servers are configured to be virtual machines.

11. A method for controlling an information processing apparatus that communicates with a plurality of servers in which use cost occurs periodically in executing a task, the method comprising:
   obtaining information indicating progress of the task from a first server executing the task;
   determining, based on a predetermined time at which the use cost occurs and time needed to transfer the task, whether the progress of the task is delayed;
   selecting, if the progress of the task is determined to be delayed, a second server with a higher throughput than that of the first server; and
   instructing the selected second server to execute the task.

12. A non-transitory computer readable storage medium storing a program causing an information processing apparatus that communicates with a plurality of servers in which use cost occurs periodically in executing a task to execute a method, the method comprising:
   obtaining information indicating progress of the task from a first server executing the task;
   determining, based on the obtained information at timing based on a predetermined time at which the use cost occurs and time needed to transfer the task, whether the progress of the task is delayed;
   selecting, if the progress of the task is determined to be delayed, a second server with a higher throughput than that of the first server; and
   instructing the selected second server to execute the task.

* * * * *